US010372677B2

(12) United States Patent
Yang et al.

(10) Patent No.: US 10,372,677 B2
(45) Date of Patent: Aug. 6, 2019

(54) IN-MEMORY SHARED DATA REUSE REPLACEMENT AND CACHING

(71) Applicant: Samsung Electronics Co., Ltd., Suwon-si, Gyeonggi-do (KR)

(72) Inventors: Zhengyu Yang, Boston, MA (US); Jiayin Wang, Dorchester, MA (US); Thomas David Evans, San Marcos, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/404,121

(22) Filed: Jan. 11, 2017

(65) Prior Publication Data
US 2018/0067869 A1 Mar. 8, 2018

Related U.S. Application Data

(60) Provisional application No. 62/384,078, filed on Sep. 6, 2016.

(51) Int. Cl.
*G06F 12/12* (2016.01)
*G06F 12/08* (2016.01)
(Continued)

(52) U.S. Cl.
CPC .............. *G06F 16/172* (2019.01); *G06F 3/06* (2013.01); *G06F 9/45558* (2013.01);
(Continued)

(58) Field of Classification Search
None
See application file for complete search history.

(56) References Cited

U.S. PATENT DOCUMENTS 5,627,990 A    5/1997 Cord et al.
5,768,594 A *  6/1998 Blelloch ............... G06F 9/5066
                                          717/149
(Continued)

FOREIGN PATENT DOCUMENTS

CN    103955436 A    7/2014
CN    102467452 B    8/2014
(Continued)

OTHER PUBLICATIONS

Bocchino Parallel Programming Must Be Deterministic by Default U of Illinois 2009 (Year: 2009).*
(Continued)

*Primary Examiner* — Reginald G Bragdon
*Assistant Examiner* — Paul M Knight
(74) *Attorney, Agent, or Firm* — Lewis Roca Rothgerber Christie LLP

(57) ABSTRACT

A cache management system for managing a plurality of intermediate data includes a processor and a memory having stored thereon instructions that cause the processor to perform identifying a new intermediate data to be accessed, loading the intermediate data from the memory in response to identifying the new intermediate data as one of the plurality of intermediate data, in response to not identifying the new intermediate data as one of the plurality of intermediate data, selecting a set of victim intermediate data to evict from the memory based on a plurality of scores associated with respective ones of the plurality of intermediate data, the scores being based on a score table, evicting the set of victim intermediate data from the memory, updating the score table based on the set of victim intermediate data, and adding the new intermediate data to the plurality of intermediate data stored in the memory.

20 Claims, 11 Drawing Sheets

(51) Int. Cl.
  *G06F 16/172* (2019.01)
  *G06F 16/188* (2019.01)
  *G06F 9/455* (2018.01)
  *G06F 12/0862* (2016.01)
  *G06F 12/123* (2016.01)
  *G06F 12/0808* (2016.01)
  *G06F 12/0842* (2016.01)
  *G06F 12/126* (2016.01)
  *G06F 12/0811* (2016.01)
  *G06F 3/06* (2006.01)
  *G06F 12/0868* (2016.01)

(52) U.S. Cl.
  CPC ...... *G06F 12/0808* (2013.01); *G06F 12/0811* (2013.01); *G06F 12/0842* (2013.01); *G06F 12/0862* (2013.01); *G06F 12/124* (2013.01); *G06F 12/126* (2013.01); *G06F 16/188* (2019.01); *G06F 12/0868* (2013.01); *G06F 2009/4557* (2013.01); *G06F 2009/45579* (2013.01); *G06F 2009/45583* (2013.01); *G06F 2212/1021* (2013.01); *G06F 2212/602* (2013.01); *G06F 2212/6024* (2013.01); *G06F 2212/62* (2013.01)

(56) References Cited

U.S. PATENT DOCUMENTS

| | | | |
|---|---|---|---|
| 6,519,756 B1* | 2/2003 | Kao | G06F 17/5045 365/51 |
| 6,553,394 B1* | 4/2003 | Perry | G06F 17/10 708/200 |
| 6,609,088 B1 | 8/2003 | Wuytack et al. | |
| 7,076,640 B2 | 7/2006 | Kadambi | |
| 7,194,587 B2 | 3/2007 | McCalpin et al. | |
| 8,140,751 B1 | 3/2012 | Wang | |
| 8,190,595 B2 | 5/2012 | Bruno et al. | |
| 8,417,872 B2 | 4/2013 | Bae et al. | |
| 8,463,825 B1 | 6/2013 | Harty et al. | |
| 8,495,178 B1 | 7/2013 | Jia et al. | |
| 8,874,848 B2 | 10/2014 | Soundararajan et al. | |
| 8,918,362 B2 | 12/2014 | Calder et al. | |
| 8,924,978 B2 | 12/2014 | Meng et al. | |
| 8,953,602 B2 | 2/2015 | Yang et al. | |
| 8,959,519 B2 | 2/2015 | Agarwal et al. | |
| 8,959,524 B2 | 2/2015 | Hirsch et al. | |
| 9,002,939 B2 | 4/2015 | Laden et al. | |
| 9,053,167 B1 | 6/2015 | Swift et al. | |
| 9,116,913 B2 | 8/2015 | Fukatani et al. | |
| 9,182,927 B2 | 11/2015 | Liu et al. | |
| 9,189,410 B2 | 11/2015 | Luo et al. | |
| 9,201,891 B2 | 12/2015 | Romanski et al. | |
| 9,213,721 B1 | 12/2015 | Faibish et al. | |
| 9,256,374 B1 | 2/2016 | Aron et al. | |
| 9,280,300 B2 | 3/2016 | Liu et al. | |
| 9,304,997 B2 | 4/2016 | Beard et al. | |
| 9,323,462 B2 | 4/2016 | Olson et al. | |
| 9,330,108 B2 | 5/2016 | Jones et al. | |
| 9,342,390 B2 | 5/2016 | Chen et al. | |
| 9,348,707 B2 | 5/2016 | Kashyap et al. | |
| 9,372,630 B2 | 6/2016 | Guo et al. | |
| 9,513,814 B1 | 12/2016 | Can et al. | |
| 9,817,766 B1 | 11/2017 | Si et al. | |
| 10,048,996 B1 | 8/2018 | Bell et al. | |
| 2002/0035605 A1 | 3/2002 | McDowell et al. | |
| 2003/0109940 A1* | 6/2003 | Guntzer | G06F 17/3025 700/52 |
| 2004/0193952 A1 | 9/2004 | Narayanan et al. | |
| 2005/0010629 A1* | 1/2005 | Hess | G01N 25/02 708/446 |
| 2005/0086384 A1 | 4/2005 | Ernst | |
| 2006/0026154 A1* | 2/2006 | Altinel | G06F 17/3048 |
| 2006/0253674 A1 | 11/2006 | Zohar et al. | |
| 2007/0033659 A1* | 2/2007 | Hoche | G06F 8/443 726/28 |
| 2008/0126547 A1 | 5/2008 | Waldspurger | |
| 2009/0049421 A1* | 2/2009 | Meijer | G06F 9/4484 717/100 |
| 2009/0276657 A1 | 11/2009 | Wetmore et al. | |
| 2009/0288084 A1 | 11/2009 | Astete et al. | |
| 2010/0281078 A1 | 11/2010 | Wang et al. | |
| 2011/0035548 A1 | 2/2011 | Kimmel et al. | |
| 2011/0302371 A1* | 12/2011 | Lysko | G06F 1/0353 711/118 |
| 2012/0268471 A1* | 10/2012 | Khalvati | G06T 1/60 345/522 |
| 2013/0055290 A1 | 2/2013 | Gaikwad et al. | |
| 2013/0073523 A1 | 3/2013 | Gounares et al. | |
| 2013/0074057 A1 | 3/2013 | Gounares et al. | |
| 2013/0124916 A1 | 5/2013 | Shutt et al. | |
| 2013/0179630 A1 | 7/2013 | Yano et al. | |
| 2013/0232382 A1 | 9/2013 | Jain et al. | |
| 2013/0290249 A1 | 10/2013 | Merriman et al. | |
| 2013/0297902 A1 | 11/2013 | Collins et al. | |
| 2014/0149637 A1 | 5/2014 | Gu et al. | |
| 2014/0164687 A1 | 6/2014 | Kwon et al. | |
| 2014/0207955 A1 | 7/2014 | Musial et al. | |
| 2014/0324785 A1 | 10/2014 | Gupta et al. | |
| 2015/0006788 A1 | 1/2015 | Liu et al. | |
| 2015/0074350 A1* | 3/2015 | Chiang | G06F 12/0808 711/118 |
| 2015/0127646 A1 | 5/2015 | Shaw | |
| 2015/0188840 A1 | 7/2015 | Xiao et al. | |
| 2015/0234617 A1 | 8/2015 | Li et al. | |
| 2015/0234719 A1 | 8/2015 | Coronado et al. | |
| 2015/0254322 A1 | 9/2015 | Ma et al. | |
| 2015/0288669 A1 | 10/2015 | Litoiu et al. | |
| 2015/0333994 A1 | 11/2015 | Gell et al. | |
| 2015/0347451 A1 | 12/2015 | Lee et al. | |
| 2016/0011876 A1 | 1/2016 | Mukherjee et al. | |
| 2016/0019286 A1 | 1/2016 | Bach et al. | |
| 2016/0132433 A1 | 5/2016 | Hayashi et al. | |
| 2016/0170882 A1 | 6/2016 | Choi et al. | |
| 2016/0188490 A1* | 6/2016 | Samih | G06F 12/0833 711/105 |
| 2016/0188898 A1 | 6/2016 | Karinta et al. | |
| 2016/0291942 A1 | 10/2016 | Hutchison | |
| 2016/0292053 A1 | 10/2016 | Antony et al. | |
| 2017/0134337 A1 | 5/2017 | Araújo | |
| 2017/0142217 A1 | 5/2017 | Misra et al. | |
| 2017/0242958 A1 | 8/2017 | Brown | |
| 2017/0244784 A1 | 8/2017 | Lam et al. | |
| 2017/0318091 A1 | 11/2017 | Ke et al. | |
| 2018/0025092 A1* | 1/2018 | Aharonov | G06F 17/30958 707/744 |
| 2018/0048712 A1 | 2/2018 | Sarisky et al. | |
| 2018/0060237 A1* | 3/2018 | Leslie-Hurd | G06F 12/0808 |

FOREIGN PATENT DOCUMENTS

JP 5478526 B2 4/2014
WO WO 2013/024952 A1 2/2013

OTHER PUBLICATIONS

Etheredge Pure and Deterministic Functions (Year: 2008).*
Hellerstein Query Execution Techniques for Caching Expensive Methods 1996 (Year: 1996).*
Kamimura_A Speed-up Technique for an Auto Memoization Processor by Reusing Partial Results of Instruction Regions (Year: 2012).*
Kathpal_Analyzing Compute vs. Storage Tradeoff for Video aware Storage Efficiency (Year: 2012).*
Khanafer_The Constrained Ski-Rental Problem and its Application to Online Cloud Cost Optimization (Year: 2013).*
Ma_Way Memoization to Reduce Fetch Energy in Instruction Caches MIT 2001 (Year: 2001).*
Mayfield_Using Automatic Memoization as a Software Engineering Tool in Real World AI Systems (Year: 1995).*

(56) References Cited

OTHER PUBLICATIONS

Spark Trademark Evidence (Year: 2018).*
Toffola_Performance Problems You Can Fix a Dynamic Analysis of Memoization Opportunities 2015 (Year: 2015).*
Ziarek_Partial Memoization of Concurrency and Communication (Year: 2009).*
Wang et al., "A New Scheme for Cache Optimization Based on Cluster Computing Framework Spark", 2015 8th International Symposium on Computational Intelligence and Design (ISCID). vol. 1. IEEE, 2015, pp. 114-117.
Apache Sparks: "core concepts, architecture and internals," http://datastrophic.io/core-concepts-architecture-and-internals-of-apache-spark/, Mar. 3, 2016 on Spark (17 pages).
Bu et al., "HaLoop: Efficient Iterative Data Processing on Large Clusters", Proc. of the VLDB, vol. 3, No. 1-2, DOI: 10.14778/1920841.1920881, Sep. 30, 2010, pp. 285-296.
Dean, Jeffrey et al., "MapReduce: Simplified Data Processing on Large Clusters", Communications of the ACM, Jan. 2008, vol. 51, No. 1 (pp. 107-113).
Ding, Chen, et al., "Predicting Whole-Program Locality through Reuse Distance Analysis," SIGPLAN Notices, 2003, pp. 245-257.
Liu, Deng, et al., "VFRM: Flash Resource Manager in VMware ESX Server," IEEE Network Operations and Management Symposium (NOMS), 2014, 7 pages.
Liu, Yi et al., "SSD as a Cloud Cache? Carefully Design about It", Shenzhen Institutes of Advanced Technology, Chinese Academy of Sciences, Shenzhen 518055, P.R. China; Department of Computer Science, University of Minnesota, Twin Cities, USA; Shenzhen College of Advanced Technology, University of Chinese Academy of Sciences, Shenzhen 518055, P.R. China, Journal of Computers, vol. 27, No. 1, Apr. 2015 (pp. 26-37).
Luo, Tian et al., "S-CAVE: Effective SSD Caching to Improve Virtual Machine Storage Performance", Proceeding, PACT '13 Proceedings of the 22nd international conference on Parallel architectures and compilation techniques, pp. 103-112, Edinburg, Scotland, UK, Oct. 7, 2013, (10 pages).
Meng, Fei, et al., "vCacheShare: Automated Server Flash Cache Space Management in a Virtualization Environment," USENIX Annual Technical Conference, 2014, pp. 133-144.
Tai, Jianzhe, et al., "Improving Flash Resource Utilization at Minimal Management Cost in Virtualized Flash-based Storage Systems," IEEE Transactions on Cloud Computing, 2015, 15 pages.
Venugopal, et al., A Taxonomy of Data Grids for Distributed Data Sharing, Management and Processing, ACM CSUR, vol. 38, No. 1, DOI: 10.1145/1132952.1132955, Jun. 29, 2006, pp. 1-46.
Zaharia, Matei et al., "Spark: Cluster Computing with Working Sets", University of California, Berkeley, HotCloud 10 (2010): 10-10, (pp. 1-7).
Xu, Zhou, et al. "A Dynamic Distributed Replica Management Mechanism Based on Accessing Frequency Detecting," Operating Systems Review (ACM), vol. 38, No. 3, 2004, pp. 26-34; DOI: 10.1145/1035834.1035838.
Rajasekaran, Sundaresan, "Multi-Cache: Dynamic, Efficient Partitioning for Multi-Tier Caches in Consolidated VM Environments", IEEE International Conference on Cloud Engineering, 2016, Date Added to IEEE Xplore: Jun. 2, 2016, (10 pages).
Ren, Jen, "I-CASH: Intelligently Coupled Array of SSD and HDD", IEEE 17th International Symposium on High Performance Computer Architecture, 2011, Date Added to IEEE Xplore: Apr. 15, 2011, (12 pages).
"Spark Programming Guide," *Apache Spark, Version 2.1.0.,* Released on Dec. 2016, https://spark.apache.org/docs/latest/programming-guide.html#rdd-operations.
U.S. Office Action dated Apr. 11, 2018, issued in U.S. Appl. No. 15/404,100 (24 pages).
U.S. Office Action dated Apr. 19, 2018, issued in U.S. Appl. No. 15/423,384 (20 pages).
Chiang et al, "An Adaptive IO Prefetching Approach for Virtualized Data Centers," IEEE 2015, 14 pages.
U.S. Office Action dated Aug. 10, 2018, issued in U.S. Appl. No. 15/400,835, 16 pages.
U.S. Final Office Action dated Feb. 7, 2019, issued in U.S. Appl. No. 15/400,835 (12 pages).
Lecture 18: Dynamic Programming I: Memoization, Fibonacci, Crazy Eights; MIT, Dept of Computer Science and AI; Fall 2009; Available at http://courses.csail.nnitedu/6.006/fal109/lecture notes/lecture18.pdf (Year: 2009).
Intercepting Functions for Memoization: A Case Study Using Transcendental Functions by Suresh (Year: 2015).
U.S. Office Action dated Oct. 17, 2018, issued in U.S. Appl. No. 15/408,328 (10 pages).
U.S. Advisory Action dated Oct. 29, 2018, issued in U.S. Appl. No. 15/404,100, citing the Non-Patent Literature listed above (8 pages).
A Stochastic Memoizer for Sequence Data by Wood; International Conference on Machine Learning, Montreal, Canada, 2009. Year: 2009).
U.S. Notice of Allowance dated Dec. 31, 2018, issued in U.S. Appl. No. 15/404,100 (12 pages).

* cited by examiner

US 10,372,677 B2

IN-MEMORY SHARED DATA REUSE REPLACEMENT AND CACHING

CROSS-REFERENCE TO RELATED APPLICATION(S)

This application claims the benefit of and priority to U.S. Provisional Patent Application No. 62/384,078 filed Sep. 6, 2016, the entire content of which is incorporated herein by reference.

FIELD

Aspects of the present invention relate to the field of memory management in memory systems.

BACKGROUND

The Apache Spark framework is a generalized framework for distributed data processing providing functional APIs for manipulating data at scale, in-memory data caching, and reuse across computations. It applies a set of coarse-grained transformations over partitioned data and relies on a dataset's lineage to re-compute tasks in case of failures. Spark provides programmers with an application programming interface centered on a data structure called the resilient distributed dataset (RDD), a read-only multiset of data items distributed over a cluster of machines, which is maintained in a fault-tolerant way. From a caching point of view, RDD represents distributed immutable data (partitioned data and iterator) and lazily evaluated operations (transformations). RDD has the following properties: different RDDs may have different sizes (in bytes); different RDDs' re-generating times may be different; a child RDD's re-generating time may be changed if its parent RDD(s) is (are) removed from the memory; and operations on RDD have different types, such as transformations, actions, and persistence. Spark improves the system performance by storing as many intermediate results (such as resilient distributed datasets (RDDs)) into the volatile memory instead of long-term data storage (such as a hard disk drive (HDD)) as possible.

However, this all-in-memory caching management scheme is limited by the finite size of memory, and cached RDDs may be evicted from the random access memory (RAM) by the Spark's default least recently used (LRU) policy, which may be not optimal for many use cases.

SUMMARY

Aspects of embodiments of the present invention are directed to a cache manager, which selects a victim intermediate data (e.g., a victim resilient distributed dataset (RDD)) with the consideration of both the importance degrees and sizes of cached intermediate data (e.g., RDDs). According to some embodiments, for each cache miss, the cache manager comprehensively makes eviction decisions based on a "score table" which monitors each intermediate data's (e.g., RDD's) re-generate time cost, children/dependence number, occupancy size, and/or the like. Thus, embodiments of the present invention may increase the dataset caching hit ratio in memory and improve the overall system performance.

According to some embodiments of the present invention, there is provided a cache management system for managing a plurality of intermediate data, the cache management system including: a processor; and a memory having stored thereon the plurality of intermediate data and instructions that when executed by the processor, cause the processor to perform: identifying a new intermediate data to be accessed; loading the intermediate data from the memory in response to identifying the new intermediate data as one of the plurality of intermediate data; in response to not identifying the new intermediate data as one of the plurality of intermediate data: selecting a set of victim intermediate data from the plurality of intermediate data to evict from the memory based on a plurality of scores associated with respective ones of the plurality of intermediate data, the plurality of scores being based on a score table stored in the memory; evicting the set of victim intermediate data from the memory; updating the score table based on the set of victim intermediate data; and adding the new intermediate data to the plurality of intermediate data stored in the memory.

In some embodiments, the score table includes for each intermediate data of the plurality of intermediate data a number of children of the intermediate data, a size of the intermediate data, a re-compute time of the intermediate data, and a generating logic chain of the intermediate data.

In some embodiments, each one of the plurality of intermediate data is a resilient distributed data (RDD), and the cache management system operates under a Spark framework.

In some embodiments, the selecting of the set of victim intermediate data includes: identifying a first set of intermediate data of the plurality of intermediate data, each one of the first set of intermediate data having a size less than that of the new intermediate data.

In some embodiments, the selecting of the set of victim intermediate data includes: in response to the first set of intermediate data not being empty: sorting the first set of intermediate data in a sorted order based on first scores associated with respective ones of the first set of intermediate data; and adding ones of the first set of intermediate data to the set of victim intermediate data to be evicted, based on the sorted order, while a cumulative size of the set of victim intermediate data is less than the new intermediate data.

In some embodiments, the order is an ascending order.

In some embodiments, the selecting of the set of victim intermediate data further includes: generating each one of the first scores based on a re-compute time of, a number of children of, and a size of an associated one of the first set of intermediate data stored at the score table.

In some embodiments, the generating of each one of the first scores includes: calculating a product of a re-compute time and a number of children of an associated one of the first set of intermediate data; and dividing the calculated product by a size of the associated one of the first set of intermediate data to calculate the one of the first scores.

In some embodiments, the selecting of the set of victim intermediate data includes: in response to the first set of intermediate data having a size smaller than the new intermediate data: emptying the set of victim intermediate data; identifying a second set of intermediate data of the plurality of intermediate data, each one of the second set of intermediate data having a size greater than or equal to that of the new intermediate data; generating second scores associated with respective ones of the plurality of intermediate data based on the score table; and selecting one intermediate data, as the set of victim intermediate data, from a second set of intermediate data having a lowest associated score among the second scores.

In some embodiments, the generating of the second scores includes: generating each one of the second scores based on a re-compute time of, a number of children of, and a size of an associated one of the second set of intermediate data stored at the score table.

In some embodiments, the updating of the score table includes: for each one of the set of victim intermediate data: identifying a child intermediate data associated with the one of the set of victim intermediate data; calculating a re-compute time of the child intermediate data based on a re-compute time of the one of the set of victim intermediate data; and updating the score table based on the calculated re-compute time of the child intermediate data.

According to some embodiments of the present invention, there is provided a cache management system for managing a plurality of intermediate data, the cache management system including: a processor; and a memory having stored thereon a plurality of intermediate data and instructions that when executed by the processor, cause the processor to perform: identifying a new intermediate data to be accessed; loading the intermediate data from the memory in response to identifying the new intermediate data as one of the plurality of intermediate data; in response to not identifying the new intermediate data as one of the plurality of intermediate data: generating a plurality of scores associated with respective ones of the plurality of intermediate data, each of the plurality of scores being based on a re-compute time of, a number of children of, and a size of an associated one of the plurality of intermediate data stored at a score table in the memory; selecting a set of victim intermediate data from the plurality of intermediate data to evict from the memory based on a plurality of scores associated with respective ones of the plurality of intermediate data; evicting the set of victim intermediate data from the memory; updating the score table based on the set of victim intermediate data; and adding the new intermediate data to the plurality of intermediate data stored in the memory.

According to some embodiments of the present invention, there is provided a method of managing a plurality of intermediate data stored in a memory, the method including: identifying, by a processor, a new intermediate data to be accessed; loading, by the processor, the intermediate data from the memory in response to identifying the new intermediate data as one of the plurality of intermediate data; in response to not identifying the new intermediate data as one of the plurality of intermediate data: selecting, by the processor, a set of victim intermediate data from the plurality of intermediate data to evict from the memory based on a plurality of scores associated with respective ones of the plurality of intermediate data, the plurality of scores being based on a score table stored in the memory; evicting, by the processor, the set of victim intermediate data from the memory; updating, by the processor, the score table based on the set of victim intermediate data; and adding, by the processor, the new intermediate data to the plurality of intermediate data stored in the memory.

In some embodiments, the score table includes for each intermediate data of the plurality of intermediate data a number of children of the intermediate data, a size of the intermediate data, a re-compute time of the intermediate data, and a generating logic chain of the intermediate data.

In some embodiments, the selecting of the set of victim intermediate data includes: identifying a first set of intermediate data of the plurality of intermediate data, each one of the first set of intermediate data having a size less than that of the new intermediate data.

In some embodiments, the selecting of the set of victim intermediate data includes: in response to the first set of intermediate data not being empty: sorting the first set of intermediate data in a sorted order based on first scores associated with respective ones of the first set of intermediate data; and adding ones of the first set of intermediate data to the set of victim intermediate data to be evicted, based on the sorted order, while a cumulative size of the set of victim intermediate data is less than or equal to the new intermediate data, wherein the order is an ascending order.

In some embodiments, the selecting of the set of victim intermediate data further includes: generating each one of the first scores based on a re-compute time of, a number of children of, and a size of an associated one of the first set of intermediate data stored at the score table.

In some embodiments, the selecting of the set of victim intermediate data includes: in response to the first set of intermediate data having a size smaller than the new intermediate data: emptying the set of victim intermediate data; identifying a second set of intermediate data of the plurality of intermediate data, each one of the second set of intermediate data having a size greater than or equal to that of the new intermediate data; generating second scores associated with respective ones of the plurality of intermediate data based on the score table; and selecting one intermediate data, as the set of victim intermediate data, from a second set of intermediate data having a lowest associated score among the second scores.

In some embodiments, the generating of the second scores includes: generating each one of the second scores based on a re-compute time of, a number of children of, and a size of an associated one of the second set of intermediate data stored at the score table.

In some embodiments, the updating of the score table includes: for each one of the set of victim intermediate data: identifying a child intermediate data associated with the one of the set of victim intermediate data; calculating a re-compute time of the child intermediate data based on a re-compute time of the one of the set of victim intermediate data; and updating the score table based on the calculated re-compute time of the child intermediate data.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

Figure 1:
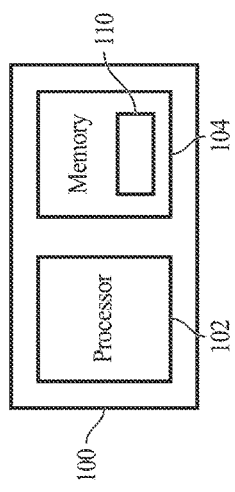
FIG. 1 illustrates a cache management system utilizing a cache manager, according to some example embodiments of the present invention.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

As will be understood by a person of ordinary skill in the art, while some embodiments of the present invention may be described in the context of the Apache Spark system, embodiments of the present invention are not limited thereto. Rather, embodiments of the present invention, and the term "Spark" as used herein, may be applied to any suitable cluster compute engine for scalable data processing, having the same or similar characteristics described herein.

FIG. 1 illustrates a cache management system 100 utilizing the cache manager 110, according to some example embodiments of the present invention.

The processing system 100 may include a processor 102 and a memory 104. The memory 104 may include volatile memory (e.g., random access memory (RAM), such as dynamic RAM) and non-volatile memory (e.g., a hard disk drive (HDD) or a solid state drive (SSD)), which may serve as long-term storage. The cache manager 110, according to some embodiments, may reside at the memory 104 and its operations may be performed by the processor 102.

According to some embodiments, the cache manager 110 may operate within the Spark framework. Spark is a generalized framework for distributed data processing providing functional application programming interface (API) for manipulating data at scale, in-memory data caching and reuse across computations. Spark applies a set of coarse-grained transformations over partitioned data and relies on a dataset's lineage to re-compute tasks in case of failures. Spark supports a majority of data formats, has integrations with various storage systems, and may be executed on a cluster manager, such as Apache Mesos or Apache Hadoop YARN (Yet Another Resource Negotiator).

Figure 2:
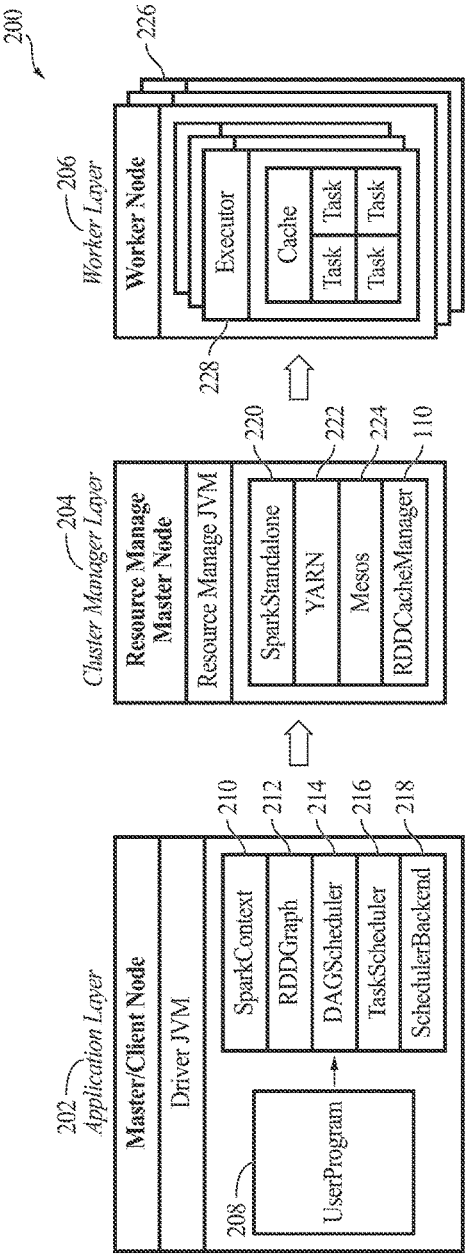
FIG. 2 illustrates a Spark architecture that utilizes the cache manager, according to some example embodiments of the present invention.

FIG. 2 illustrates an architecture (e.g., a Spark architecture) 200 that utilizes the cache manager 110 according to some example embodiments of the present invention.

Referring to FIG. 2, the spark architecture 200 includes an application layer (e.g., a Spark Application Layer) 202, a cluster manager layer 204, and a worker layer 206.

The spark application layer includes user program 208 and spark context 210 and creates RDDs and performing a series of transformations to achieve a final result. The RDD may represent a minimum unit for caching. These transformations of RDDs are then translated into a directed Acyclic graph (DAG) structure (also referred to as an RDD architecture, an RDD graph, or a generating logic chain) and submitted to the DAG scheduler 214 to be executed on a set of worker nodes 220. The spark context 210 represents the connection to a spark cluster, and may be used to create RDDs, accumulators, and broadcast variables on that cluster. For example, the spark context 210 includes RDD graph 212, DAG scheduler 214, task scheduler 216, and scheduler backend modules 218.

The cluster manager layer 204 may run different implementations (e.g., spark standalone 220, YARN 222, Mesos 224). According to some embodiments, the cache manager (e.g., of the resilient distributed dataset, RDD) 110 resides at (e.g., is configured to be incorporated or plugged into) the cluster manager layer 204.

The worker Layer 206 includes multiple work nodes 226, each of which is a java virtual machine (JVM) running multiple executors 228. The executors 228 run tasks scheduled by a driver, store computation results in memory, and then conduct on-disk or off-heap interactions with storage systems. The executors 228 may run as Java processes, so that the available memory is equal to the heap size. Internally available memory is split into several regions with specific functions.

Figure 3:
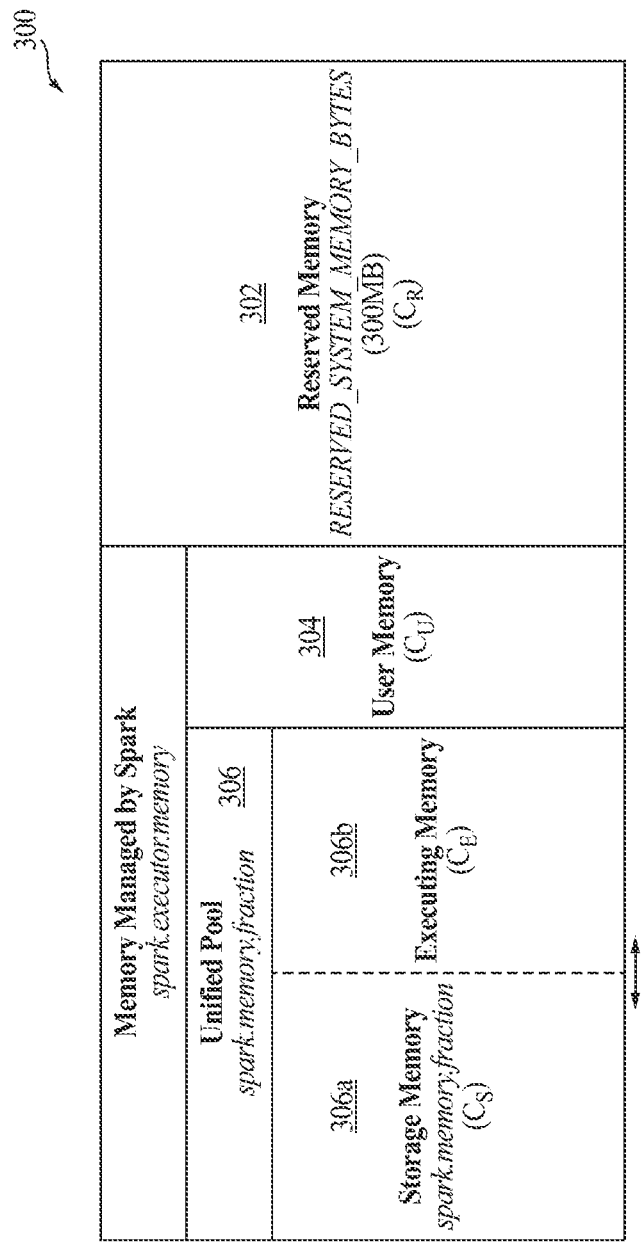
FIG. 3 illustrates an example of memory partitions under the Spark framework.

FIG. 3 illustrates an example of memory partitions under the Spark framework.

Referring to FIG. 3, the volatile portion 300 of memory 104 may be partitioned into reserved memory 302, user memory 304, and the unified pool 306. The reserved memory ($C_R$) 302 is reserved by the system and has a hardcoded size (e.g., 300 MB in Spark version 1.6). This partition is for running executor 228 and may not be strictly related to Spark. The user memory ($C_U$) 304 may store user data structures, which may be used in RDD transformations, and internal metadata used by Spark. For example, users may rewrite Spark aggregation by using the mapPartitions transformation maintaining hash table for this aggregation to run, which would consume user memory 304. The unified pool may be split into two non-static sub-partitions: storage memory 306a and executing memory 306b, and the boundary therebetween may be set by the spark.memory.storage-Fraction parameter (defaults to 50%). The storage memory ($C_S$) 306a is used for storing Spark cached data and for temporary space serialized data unroll. Also, all the broadcast variables are stored there as cached blocks. The cache manager 110, according to some embodiments, is focused on this partition, as user "preserved" RDDs are stored in the storage memory 306a. The executing memory ($C_E$) 306b is used for storing the objects required during the execution of Spark tasks. The size of said memory partitions may be related according to the following two Equations:

$$C = C_R + C_U + C_E + C_S \quad (1)$$

$$C_S = (C - C_R - C_U) \times \varepsilon \quad (2)$$

where C represents total memory size, and $\varepsilon$ (i.e., spark.memory.fraction) adjusts the sizes of storage and executing memory 306a and 306b. The cache manager 110 is incorporated into the cluster manager layer 204 and operates on the RDDs stored ("preserved") by the user in the storage memory 306a. Embodiments of the present invention primarily focus on the scenario where the amount of total (or accumulated) preserved RDDs requested by the user is larger than the total available space of storage memory ($C_S$), and the cache manager 110, rather than using the related art least recently used (LRU) eviction policy, intelligently and efficiently evicts RDD victims before inserting a new RDD.

According to embodiments of the present invention, the cache manager 110 performs a caching replacement process, whereby victim datasets (e.g., victim RDD(s)) are selected with the consideration of both the importance and sizes of these cached RDDs. For example, for each cache miss, the cache manager 110 may comprehensively make decisions based on a "score table" which monitors each RDD's re-generate time cost, children/dependence number, occupancy size, and/or the like. Embodiments of the present invention may be configured to increase the caching hit ratio in memory 104 and improve the overall system performance (e.g., performance of Spark framework) by reusing intermediate data (e.g., RDDs) instead of re-computing them. According to some embodiments of the present invention, intermediate data is reused by optimizing the cache that stores user preserved intermediate data sets (e.g., user preserved RDDs).

Figures 4A, 4B:
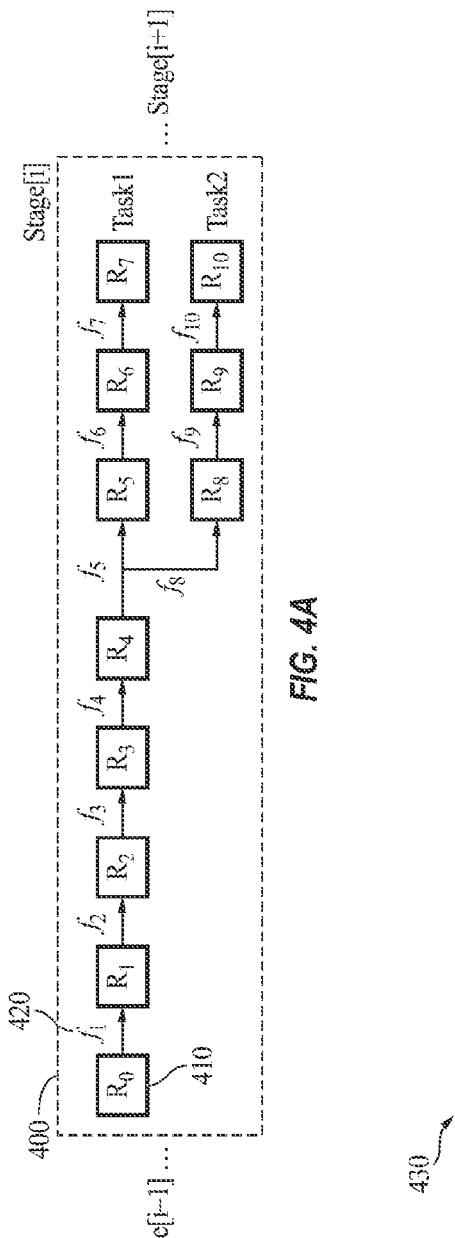
FIGS. 4A and 4B illustrate an example of a resilient distributed dataset (RDD) lookup procedure, according to some example embodiments of the present invention.

FIGS. 4A and 4B illustrate an example of an RDD lookup procedure, according to some example embodiments of the present invention. FIG. 4A illustrates an example of a DAG structure (e.g., an RDD graph or generating logic chain) 400 of an example RDD transformation, where there are 11 RDDs (intermediate data) 410 and 10 transformations 420 in stage[i]. FIG. 4B illustrates an example score table 430 generated and maintained by the cache manager 110, according to some embodiments of the present invention, to track certain information about each accessed RDD. According to some embodiments, the cache manager 110 records, in the score table 430, spatial (i.e., RDD size in bytes) and temporal (i.e., re-computation) costs, as well as generating operation chain (i.e., GenChain, source RDD, child#) of each RDD. Based on these tabulated records, the cache manager 110 can calculate the score (e.g., "importance degree") of each RDD when making decisions on victim selection and eviction. In some embodiments, the score table contains more parameters than those shown in Table 1, such as time costs of prefetching from memory/SSD/HDD if a multi-tier storage system is utilized. In some embodiments, the score table is stored in the storage memory 306a; however, embodiments of the present invention are not limited thereto, and the score table may be at least partially (e.g., fully) stored in non-volatile memory (e.g., NVMe disk, SSD or HDD).

Figure 5:
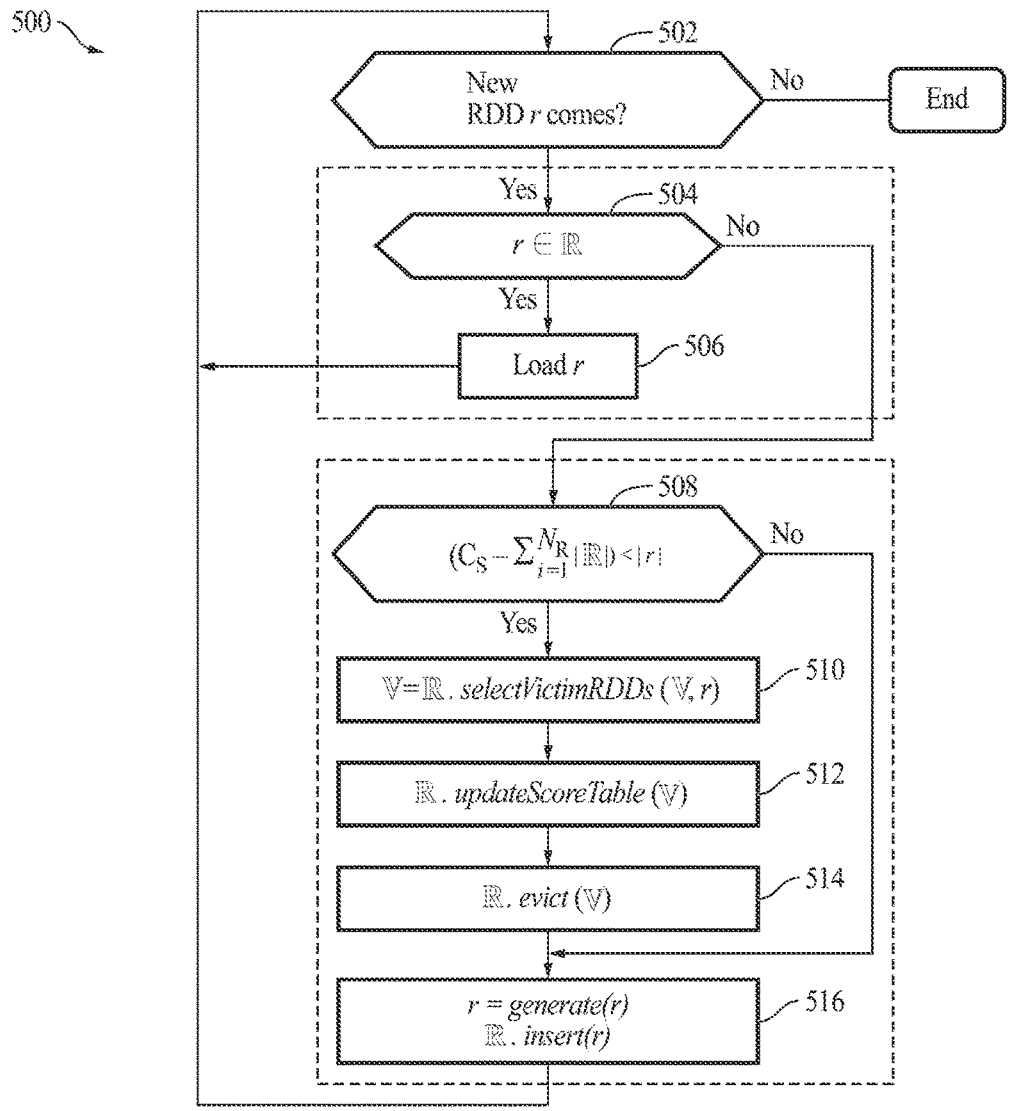
FIG. 5 is a flow diagram illustrating a process of performing an RDD caching policy, according to some example embodiments of the present invention.

FIG. 5 is a flow diagram illustrating a process 500 of the cache manager 110 for performing an RDD caching policy, according to some example embodiments of the present invention.

According to some examples, for every new RDD to be accessed (act 502), when the new RDD r is found in the cache $\mathbb{R}$ in act 504 (i.e., there is cache hit), the cache manager 110 loads the cached RDD r in act 506. Otherwise, if the RDD r is not found in the cache $\mathbb{R}$ in act 504, the cache manager 110 first checks, in act 508, whether the cache (i.e., storage memory ($C_S$) 306a) has sufficient capacity to store the new RDD. If there is sufficient space for the RDD, the cache manager 110 proceeds to act 516. If there is insufficient space for the RDD, in act 510, the cache manager 110 selects victim RDD(s) to evict (e.g., delete) from the cache (the selectVictimRDDs function); in act 512, updates the score table (the updateScoreTable function) accordingly; and, in act 514, evicts the victim RDD(s). Thereafter, in act 516, the cache manager 110 generates (e.g., computes) the new RDD r and inserts it into the memory (e.g., storage memory ($C_S$) 306a). The process 500 is also shown as the pseudo code below:

---

Process 500

---

1  Procedure RDDCache (r)
2    for each new RDD r do
3      if r ∈ $\mathbb{R}$ then
4        load r
5      else
6        if ($C_S$ - $\Sigma_{i=1}^{N_\mathbb{R}}$ |$\mathbb{R}$|) < |r| then
7          $\mathbb{V}$ = ∅
8          $\mathbb{V}$ = $\mathbb{R}$.selectVictimRDDs($\mathbb{V}$, r)
9          updateScoreTable($\mathbb{R}$, $\mathbb{V}$)
10         $\mathbb{R}$.evict($\mathbb{V}$)
11       r = generate(r)
12       $\mathbb{R}$.insert(r)
14   Return

--- where $\mathbb{R}$ represents the set of RDDs stored in the storage memory 306a (e.g., RAM), $\mathbb{V}$ represents the set of victim RDDs to be evicted from the storage memory 306a, and $N_\mathbb{R}$ represents the total number of RDDs in the storage memory 306a, $C_S$ represents the size (e.g., in bytes) of the storage memory 306a, $\Sigma_{i=1}^{N_\mathbb{R}}$ |$\mathbb{R}$| represents the sum total of the size of the set of RDDs stored in the storage memory 306a, and |r| represents the size of the new RDD.

According to some embodiments, the RDD victim selection process (i.e., the selectVictimRDDs function) is converted to a multi-objective optimization process, as expressed in equations 3 to 6 below:

$$\text{Minimize} \left( \left( \sum_{i=1}^{N_\mathbb{V}} |\mathbb{V}_i| \right) - |r|, \sum_{i=1}^{N_\mathbb{V}} S(\mathbb{V}_i) \right) \quad (3)$$

$$\text{Subject to: } |r| \leq C_S \quad (4)$$

$$\mathbb{V} \subseteq \mathbb{R} \quad (5)$$

$$\left( \sum_{i=1}^{N_\mathbb{V}} |\mathbb{V}_i| \right) - |r| \geq 0 \quad (6)$$

The first objective function in Equation 3 aims to reduce (e.g., minimize) the size of the evicted RDD(s) $\mathbb{V}$ ($\sum_{i=1}^{N_\mathbb{V}} |\mathbb{V}_i|$, where $N_\mathbb{V}$ represents the number of victim RDD(s)) based on the size of the new RDD (|r|). The aim of the second objective function in Equation 3 is to minimize the total of the scores of evicted RDDs ($\sum_{i=1}^{N_\mathbb{V}} S(\mathbb{V})$). The score of an RDD may represent the importance of the RDD and may be determined based on the score table 430, which tracks each accessed RDD's generating logic chain (transformation functions and dependent RDDs), children number, RDD size in bytes, and generating time cost (re-computing time). In some embodiments of the present invention, the cache manager 110 evicts as few stored RDDs as possible, and selects for eviction those RDD with as low a score as possible.

Equation 4 expresses the assumption upon which the process 500 is based, which is that the new RDD (r) should not be larger than the entire available memory size (i.e., $C_S$, the entire size of the memory storage 306a). Equation 5 expresses that the set of victim RDD(s) ($\mathbb{V}$) is a subset of the entire RDD set ($\mathbb{R}$) stored in the RAM. Equation 6 expresses the aim that the total space of victims should cover the new RDD's working set space.

According to embodiments of the present invention, when selecting victim RDDs, the cache manager 110 aims to achieve the objective of Equation 3 as much as practicable, while also satisfying the conditions of Equations 4 to 6. Example embodiments of the present invention operate to set different importance score functions and victim candidate sets for different cases.

Figure 6:
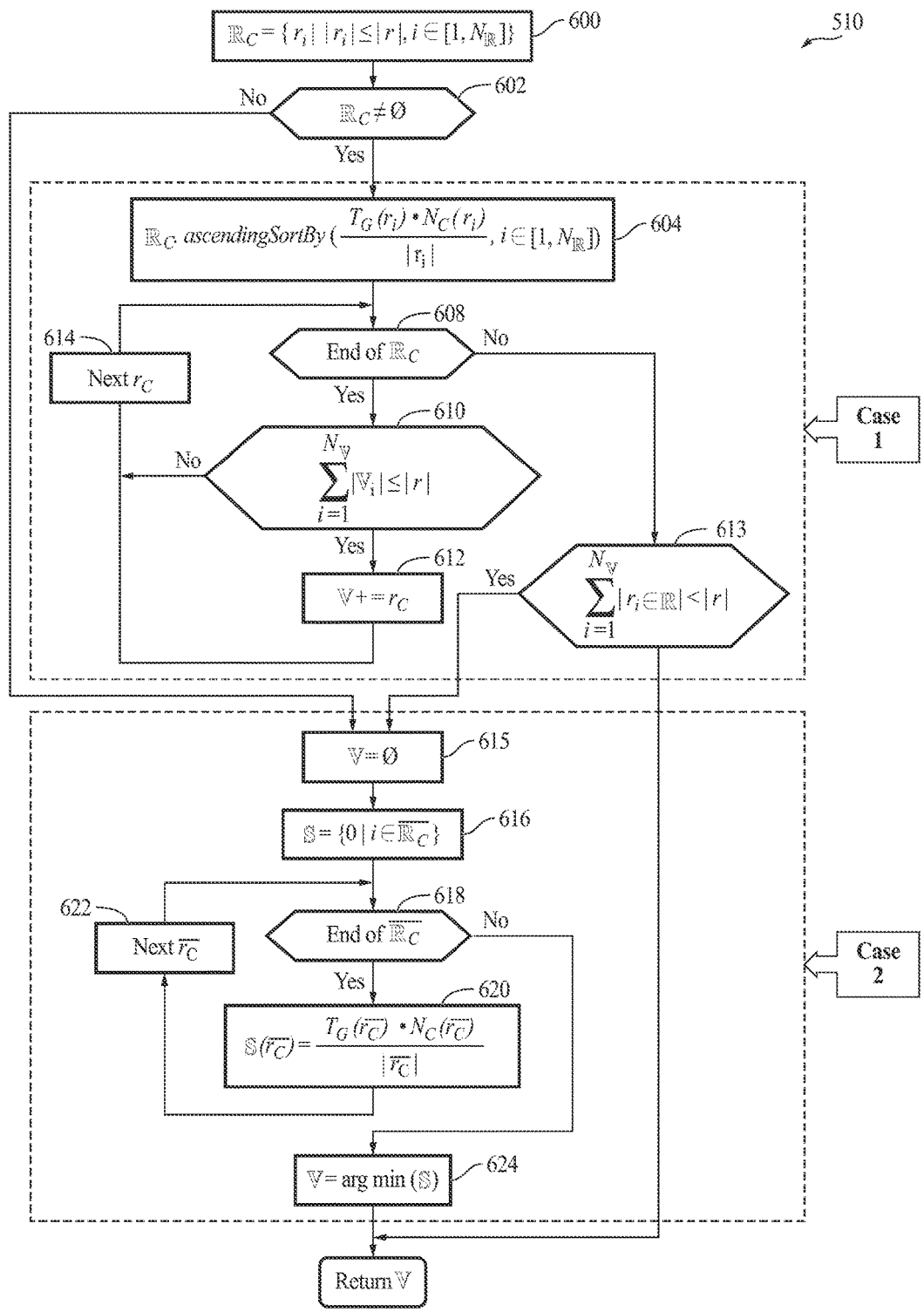
FIG. 6 illustrates a process of victim selection performed by the cache manager, according to some example embodiments of the present invention.

FIG. 6 illustrates the process 510 of victim selection (i.e., the selectVictimRDDs function) performed by the cache manager 110, according to some example embodiments of the present invention. The process 510 is also shown in the pseudo code below:

| | Procedure 510 |
|---|---|
| 1 | Procedure selectVictimRDDs ($\mathbb{V}$, r) |
| 2 | $\mathbb{R}_C = \{r_i \mid |r_i| \leq |r|, i \in [1, N_\mathbb{R}]\}$ |
| 3 | if $\mathbb{R}_C \neq \emptyset$ do |
| 4 | $\mathbb{R}_C \cdot \text{ascendingSortBy}\left(\frac{T_G(r_i) \cdot N_C(r_i)}{|r_i|}, i \in [1, N_\mathbb{R}]\right)$ |
| 5 | for $r_C$ in $\mathbb{R}_C$ do |
| 6 | if $\sum_{i=1}^{N_\mathbb{V}} |\mathbb{V}_i| \leq |r|$ then |
| 7 | $\mathbb{V} \mathrel{+}= r_C$ |
| 8 | else if $\mathbb{R}_C = \emptyset$ or $\sum_{i=1}^{N_\mathbb{V}} |r_i|$ in $\mathbb{R}_C| < |r|$ then |
| 9 | $\mathbb{V} = \emptyset$ |
| 10 | $\mathbb{S} = \{0 \mid i \in \overline{\mathbb{R}_C}\}$ |
| 11 | for $\overline{r_C} \in \overline{\mathbb{R}_C}$ do |
| 12 | $\mathbb{S}(\overline{r_C}) = \frac{T_G(\overline{r_C}) \cdot N_C(\overline{r_C})}{|\overline{r_C}|}$ |
| 13 | $\mathbb{V} = \arg\min(\mathbb{S})$ |
| 14 | return $\mathbb{V}$ | where $\mathbb{R}_C$ represents the set of cached (stored) RDDs (a first set of intermediate data) whose sizes are less than or equal to the new RDD (r), and $\mathbb{S}$ represents the record of scores of all RDDs stored in the memory (e.g., storage memory 306a).

In act 600, a subset of cached RDDs ($\mathbb{R}_C$) to record all RDDs whose sizes are smaller than the new RDD (r) is maintained. In act 602, based on whether $\mathbb{R}_C$ is an empty set or not, the problem is categorized into two cases:

Case 1: If $\mathbb{R}_C$ is not an empty set, in act 604, the cache manager 110 sets those cached RDDs whose sizes are smaller than r as victim candidates. To select one or more victims from $\mathbb{R}_C$, the cache manager 110 defines a first score (e.g., an importance degree score) as:

$$\text{Score-}v1: \frac{T_G(i) \cdot N_C(i)}{|R_i|}, \tag{7}$$

where $T_G(i)$, $N_C(i)$ and $|R_i|$ represent the re-computing (generation) time cost, the number of children RDDs, and the size (in bytes) of RDD i, respectively. As expressed in Equation 7, the cache manager 110 may assign a higher score (a higher importance degree) to an RDD that has a higher re-computing time $T_G(i)$, a greater number of children, and/or a smaller size, as the eviction of such RDDs may have a higher impact on the remaining RDDs and/or consume more system resources to recreate.

In act 608, the cache manager 110 sorts the victim candidates based on (e.g., in ascending or descending order of) the first score (Score-v1). In acts 608-614, the cache manager 110 adds the sorted RDDs to the victim RDDs subset $\mathbb{V}$ until the size of $\mathbb{V}$ is equal to or greater than the new RDD r.

Case 2: This may be presented as two sub-cases: in the first sub-case, $\mathbb{R}_C$ is not empty, but even if all RDDs in $\mathbb{R}_C$ are selected as victim RDDs, there is still not enough space for the new RDD r (i.e., $\sum_{i=1}^{N_\mathbb{V}} |r_i|$ in $\mathbb{R}_C| < |r|$; act 613). In the second sub-case, $\mathbb{R}_C$ is empty, indicating that the new RDD r is smaller than all cached RDDs, in which case the cache manager 110 selects just one RDD to evict.

In either sub-case, the cache manager 110 empties, in act 615, the victim RDD set $\mathbb{V}$ and selects and adds, in acts 616-622, only one RDD from $\overline{\mathbb{R}_C}$ ($\overline{\mathbb{R}_C} = \mathbb{R} - \mathbb{R}_C$), the complementary set of $\mathbb{R}_C$ (the second set of intermediate data), to $\mathbb{V}$. In the second sub-case, as $\mathbb{R}_C$ is empty, $\overline{\mathbb{R}_C} = \mathbb{R}$. In either sub-case, the cache manager 110 may not simply select the smallest RDD in $\overline{\mathbb{R}_C}$, as it may have a high importance degree. Therefore, in some embodiments, the cache manager 110 computes the scores (second scores) of the RDD in $\overline{\mathbb{R}_C}$ and selects the RDD with the least score (e.g., the least importance) as the victim $\mathbb{V}$ (act 624). In some embodiments, the cache manager 110 defines the score of each RDD in $\overline{\mathbb{R}_C}$ using Equation 7.

As will be understood by a person of ordinary skill in the art, the first and second sub-cases may be collapsed into the second sub-case as an empty $\mathbb{R}_C$ has a size that is less than that of the new RDD r; however, these two sub-cases are separately discussed here for clarity of illustration.

Figure 7A:
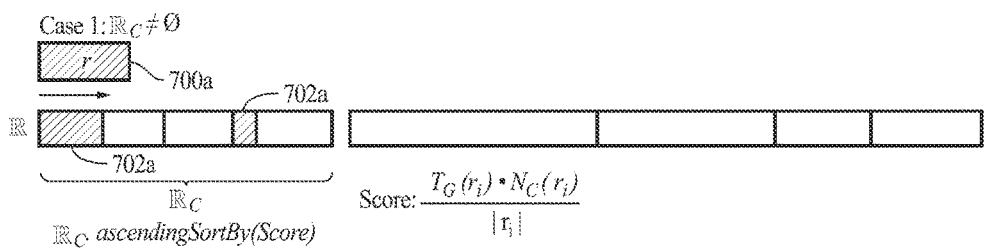
FIGS. 7A-7C illustrate various cases provided in FIG. 6, according to some example embodiments of the present invention.
Figure 7B:
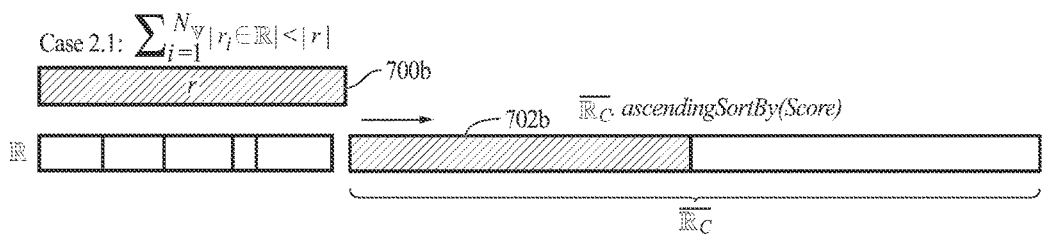
Figure 7C:
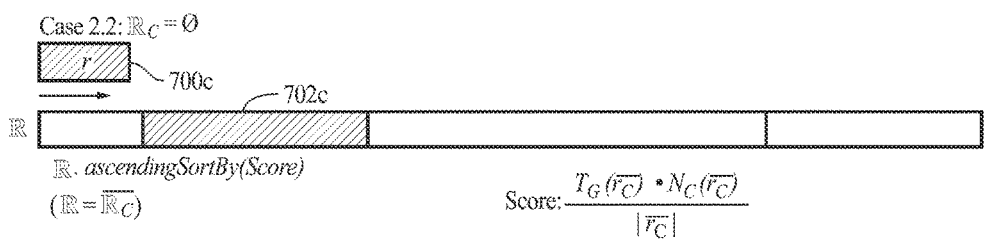

FIG. 7A illustrates case 1 described above, in which $\mathbb{R}_C$ is not empty. FIGS. 7B and 7C respectively illustrate the first sub-case and the second sub-case of Case 2 described above. In FIGS. 7A to 7C, cell 700a/b/c indicates the new RDD r and cell(s) 702a/b/c indicates the victim RDD(s) selected for eviction.

According to some embodiments, after the victim RDD set $\mathbb{V}$ is determined, and before the constituent RDD(s) is/are evicted from the storage memory 306a (e.g., the cache $\mathbb{R}$, the cache manager 110 updates the score table. The reason for this is that once an RDD is evicted, the re-computing time cost of all other RDDs that are related to said RDD (i.e., "children" of said RDD) will be changed. For example, if $RDD_3=f_3(RDD_2)$, and if the parent, $RDD_2$, is cached in the memory, then $R_3$'s time cost is $T[R2 \rightarrow R3]$. However, if $RDD_2$ is selected as a victim RDD to be removed, the cache manager 110 calculates $RDD_3$ from $RDD_1$ if $RDD_2=f_2(RDD_1)$, and thus, the cache manager 110 updates the time cost of $RDD_3$ as $T[R1 \rightarrow R2]+T[R2 \rightarrow R3]$.

Figure 8:
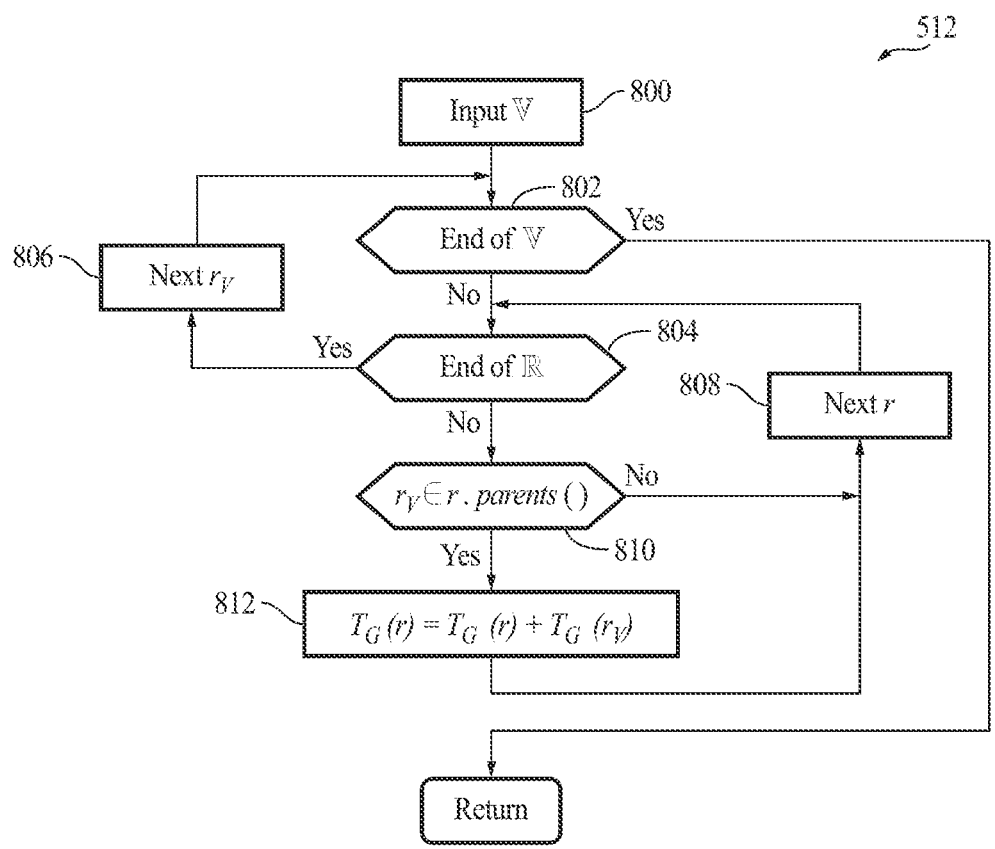
FIG. 8 illustrates a process of updating an RDD score table as performed by the cache manager, according to some example embodiments of the present invention.

FIG. 8 illustrates the process 512 of updating the score table 430 (i.e., the updateScoreTable function) performed by the cache manager 110, according to some example embodiments of the present invention. The process 512 is also shown in the pseudo code below:

---
Process 512
Note: parent( ) : Get the set of a certain RDD's parents.
---
1   Procedure updateScoreTable ($\mathbb{R}$, $\mathbb{V}$)
2       for $r_V$ in $\mathbb{V}$ do
3           for r in $\mathbb{R}$ do
4               if $r_V \in$ r.parents( ) then
5                   $T_G(r) = T_G(r) + T_G(r_V)$
6       return
---

In acts 800-812, for each selected victim RDD $r_V$ in the victim subset $\mathbb{V}$, the cache manager 110 updates re-computing times of those existing RDDs in $\mathbb{R}$ that depend on said $r_V$. In act 810, the cache manager 110 identifies a parent (e.g., a direct parent) of the victim RDD $r_V$, and in act 812, increments the re-compute time of the parent RDD by the re-compute time of the victim RDD $r_V$, and updates the score table 430 accordingly. In some embodiments, the cache manager 110 identifies a parent (e.g., direct parent) of an RDD based on the generating logic chain recorded in the score table 430 (see, e.g., FIG. 4B). In other words, the cache manager 110 identifies a child of each of the selected victim RDD $r_V$ in the victim subset $\mathbb{V}$, and re-computes the generation (re-compute) time based on the generation time of the respective victim RDD $r_V$.

According to embodiments of the present invention, the cache manager 110 performs deduplication of intermediate data (e.g., RDDs) by detecting and reducing duplicated intermediate data (e.g., duplicate RDDs) by tracking and comparing their content and the generating logic chain (i.e., operation path). Instead of solely following the user declared topologic path (e.g., hardcoded "preserved" RDDs), the cache manager 110 further actively refines the intermediate data graph (a directed multigraph with properties attached to each vertex and edge, e.g., an RDD graph), in order to improve performance by saving both temporal (e.g., re-computation time) and spatial (e.g., memory space) costs. According to some embodiments of the present invention, the cache manager 110 is configured to be plugged into any caching subsystem that has knowledge of the generating chain of each dataset (even by disassembling operations or more advanced reverse engineering techniques). Additionally, the cache manager 110 according to some example embodiments of the present invention is configured to be integrated with (e.g., adopted into) existing techniques (e.g., the techniques described in "Analyzing Compute vs. Storage Tradeoff for Video-aware Storage Efficiency" by Kathpal et al., HotStorage (2012); and "The Constrained Ski-Rental Problem and its Application to Online Cloud Cost Optimization" by Khanafer et al., INFOCOM, 2013 Proceedings IEEE (2013), the entire contents of which are incorporated herein by reference). Thus, the cache manager 110 is configured to merge duplicated datasets and increase the hit ratio in memory. The hit ratio, which is a measurement of cache memory performance, may be defined as the ratio of the number of times data requested by CPU are found in the cache (number of "hits") to the number of total CPU data requests (which includes requests for data that are not found in the cache memory, i.e., "misses").

According to some example embodiments of the present invention, the cache manager 110 is configured to detect duplicated RDDs and deterministic RDD operations, to reduce or avoid re-computation and duplicated RDD storage. While related-art deduplication algorithms may primarily focus on the dataset content itself, embodiments of the present invention also consider the generating chain of each dataset. Therefore, utilizing a "two-dimensional comparison" (i.e., RDDs and operations) according to embodiments of the present invention efficiently improves the dataset (e.g., RDD) reusability.

According to some embodiments of the present invention, the cache manager 110 differentiates between deterministic and non-deterministic operations and automatically tracks changes of the stored RDDs and their generating chains (e.g., time cost of re-computing if a cached RDD's parent RDD is evicted).

Figure 9A:
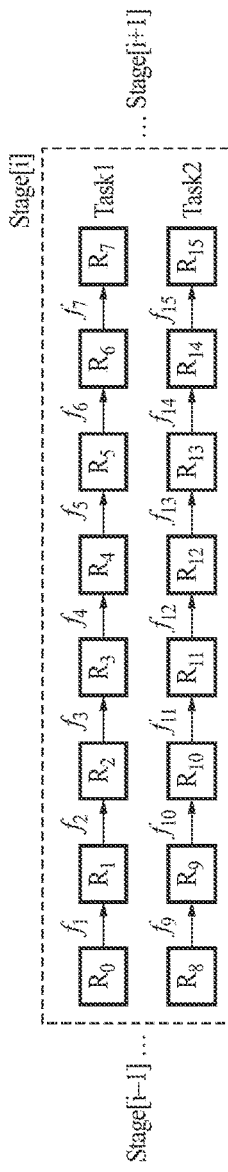
FIGS. 9A-9C illustrate the process of deduplication performed by the cache manager, according to some example embodiments of the present invention.
Figure 9B:
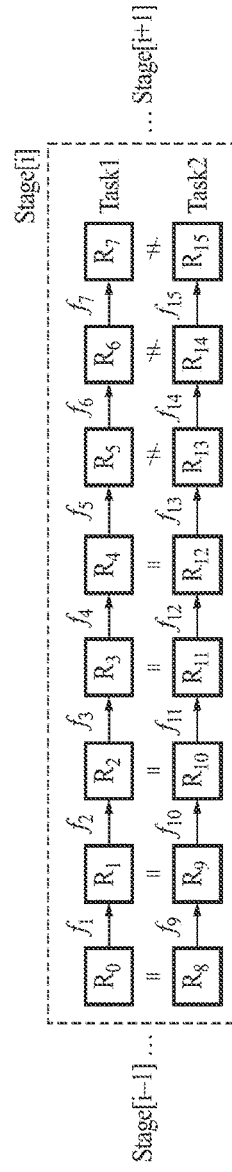
Figure 9C:
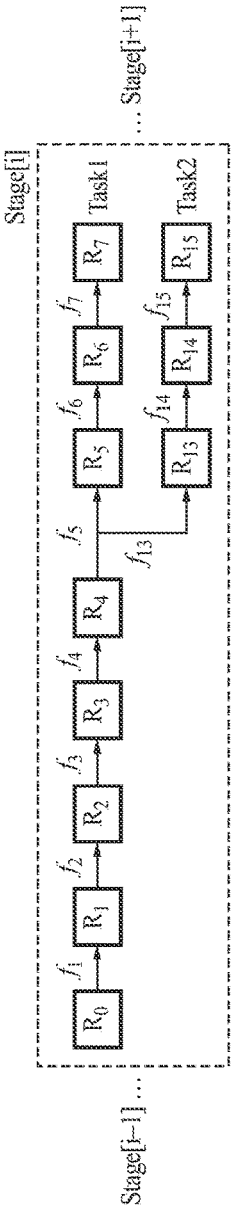

FIGS. 9A-9C illustrate the process of deduplication performed by the cache manager 110, according to some example embodiments of the present invention.

In the example shown in FIG. 9A, the RDD DAG structure includes two tasks and each task has 8 RDDs in stage[i]. The illustrated RDD graph may be based on what the user (e.g., the human programmer) hardcoded. FIGS. 9B-9C illustrate the process of comparing the RDDs and operations between RDD tasks according to some example embodiments. As shown in FIG. 9B, the cache manager 110 first compares the RDDs and the operations of stage [i] from the source (i.e., left hand side) to the end (i.e., right hand side). For example, the cache manager 110 identifies RDDs $R_0$ to $R_4$ as being respectively identical to RDDs $R_8$ to $R_{12}$, and the functions $f_1$ to $f_4$ as being respectively identical to functions $f_9$ to $f_{12}$. FIG. 9C illustrates the refined RDD graph after detection and deduplication (e.g., reuse). Instead of 16 RDDs, only 11 RDDs need to be stored in the memory without any loss in terms of cache hit ratio.

Table 1 and Table 2 illustrate the score tables respectively before and after the detection and reuse process.

TABLE 1

| RDD | GenChain | SrcRDD | Child# ($N_c$) | Size ($|R|$) | GenTime (TG) |
|---|---|---|---|---|---|
| R0 | — | R0 | 1 | $|R0|$ | 0 |
| R1 | f1 | R0 | 1 | $|R1|$ | $T[0 \rightarrow 1]$ |
| R2 | f2-f1 | R0 | 1 | $|R2|$ | $T[1 \rightarrow 2]$ |

TABLE 1-continued

| RDD | GenChain | SrcRDD | Child# ($N_c$) | Size ($|R|$) | GenTime (TG) |
|---|---|---|---|---|---|
| R3 | f3-f2-f1 | R0 | 1 | $|R3|$ | T[2→3] |
| R4 | f4-f3-f2-f1 | R0 | 1 | $|R4|$ | T[3→4] |
| R5 | f5-f4-f3-f2-f1 | R0 | 1 | $|R5|$ | T[4→5] |
| R6 | f6-f5-f4-f3-f2-f1 | R0 | 1 | $|R6|$ | T[5→6] |
| R7 | f7-f6-f5-f4-f3-f2-f1 | R0 | 0 | $|R7|$ | T[6→7] |
| R8 | — | R8 | 1 | $|R5|$ | 0 |
| R9 | f9 | R8 | 1 | $|R9|$ | T[8→9] |
| R10 | f10-f9 | R8 | 1 | $|R10|$ | T[9→10] |
| R11 | f11-f10-f9 | R8 | 1 | $|R11|$ | T[10→11] |
| R12 | f12-f11-f10-f9 | R8 | 1 | $|R12|$ | T[11→12] |
| R13 | f13-f12-f11-f10-f9 | R8 | 1 | $|R13|$ | T[12→13] |
| R14 | f14-f13-f12-f11-f10-f9 | R8 | 1 | $|R14|$ | T[13→14] |
| R15 | f15-f14-f13-f12-f11-f10-f9 | R8 | 0 | $|R15|$ | T[14→15] |

TABLE 2

| RDD | GenChain | SrcRDD | Child# ($N_c$) | Size ($|R|$) | GenTime (TG) |
|---|---|---|---|---|---|
| R0 | — | R0 | 1 | $|R0|$ | 0 |
| R1 | f1 | R0 | 1 | $|R1|$ | T[0→1] |
| R2 | f2-f1 | R0 | 1 | $|R2|$ | T[1→2] |
| R3 | f3-f2-f1 | R0 | 1 | $|R3|$ | T[2→3] |
| R4 | f4-f3-f2-f1 | R0 | 2 | $|R4|$ | T[3→4] |
| R5 | f5-f4-f3-f2-f1 | R0 | 1 | $|R5|$ | T[4→5] |
| R6 | f6-f5-f4-f3-f2-f1 | R0 | 1 | $|R6|$ | T[5→6] |
| R7 | f7-f6-f5-f4-f3-f2-f1 | R0 | 0 | $|R7|$ | T[6→7] |
| R13 | f13-f4-f3-f2-f1 | R0 | 1 | $|R13|$ | T[4→13] |
| R14 | f14-f13-f4-f3-f2-f1 | R0 | 1 | $|R14|$ | T[13→14] |
| R15 | f15-f14-f13-f4-f3-f2-f1 | R0 | 0 | $|R15|$ | T[14→15] |

Figure 10:
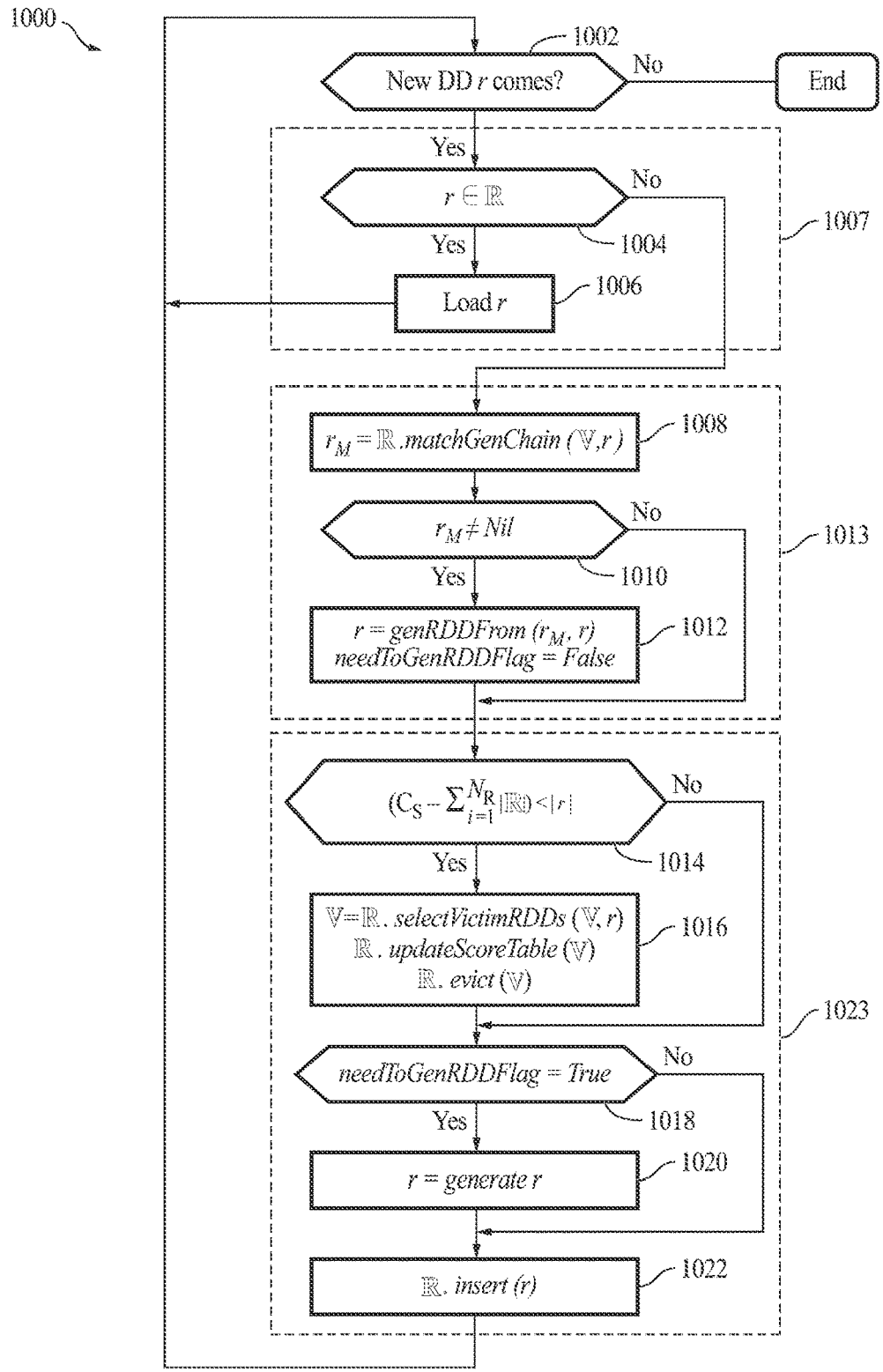
FIG. 10 is a flow diagram illustrating a process of performing an RDD caching policy, according to some example embodiments of the present invention.

FIG. 10 is a flow diagram illustrating a process 1000 of the cache manager 110 for performing an RDD caching policy, according to some example embodiments of the present invention.

Process 100 illustrates an example process of the RDD caching policy inside the cluster manager subsystem 204 within which the cache manager 110 is plugged in, according to some example embodiments. In some examples, for every new RDD to be accessed (act 1002), when the new RDD r is found in the cache $\mathbb{R}$ in act 1004 (i.e., there is cache hit), the cache manager 110 loads the cached RDD r in act 1006. Otherwise, if the RDD r is not found in the cache $\mathbb{R}$ in act 1004, the cache manager 110 finds any matched duplicate RDDs $r_M$ sharing all or a part of the new RDD's generation chain (GenChain in Table 1) in act 1008 (the matchGenChain function). In act 1010, if the search returns a non-nil value, $r_M$ represents the longest RDD chains that may be reused (e.g., in the example of FIGS. 9A-9C, if the new RDD is $R_{15}$, then $R_4$ may be returned as $r_M$). In act 1012, the cache manager 110 then generates the remaining chain from the detected reusable RDD $r_M$ (e.g., in the example of FIGS. 9A-9C, the cache manager 110 generates $R_{13}$, $R_{14}$, and then $R_{15}$). Otherwise, if the search returns a nil value in act 1010, the cache manager 110 checks, in act 1014, whether the cache (e.g., the storage memory 306a) has sufficient size (space) for this new RDD (($C - \sum_{i=1}^{N_\mathbb{R}} |\mathbb{R}|) < |r|$). If there is insufficient space, the cache manager 110 then selects one or more victim RDDs to evict from the cache, in act 1016. The cache manager 110 then generates (computes) the new RDD r if necessary (i.e., needToGenRDDFlag is False, in act 1018) and inserts it into the memory, in acts 1020 and 1022. Acts 1004 and 1006 together represent a cache hit (act 1007), acts 1008 to 1012 together represent a cache deduplication process 1013, and acts 1014 to 1022 represent a cache miss (act 1023).

As acts 1014 to 1022 are substantially similar to acts 508 to 516 of FIG. 5, a detailed description thereof may not be repeated. The process 1000 is also shown as the pseudo code below:

| Process 1000 |
|---|
| 1    Procedure RDDCache (r) |
| 2        for each new RDD r do |
| 3            needToGenRDDFlag = True |
| 4            if r ∈ $\mathbb{R}$ then |
| 5                load r |
| 6            else |
| 7                $r_M$ = $\mathbb{R}$ .matchGenChain(r) |
| 8                if $r_M$ ≠ Nil then |
| 9                    r = genRDDFrom($r_M$,r) |
| 10                   needToGenRDDFlag = False |
| 11               if ($C_S - \sum_{i=1}^{N_\mathbb{R}} |\mathbb{R}|$) < $|r|$ then |
| 12                  $\mathbb{V}$ = ∅ |
| 13                  $\mathbb{V}$ = $\mathbb{R}$ .selectVictimRDDs($\mathbb{V}$,r) |
| 14                  updateScoreTable($\mathbb{R}$, $\mathbb{V}$) |
| 15                  $\mathbb{R}$ .evict($\mathbb{V}$) |
| 16               if needToGenRDDFlag = True then |
| 17                  r = generate(r) |
| 18               $\mathbb{R}$ .insert(r) |
| 19    return |

Figure 11:
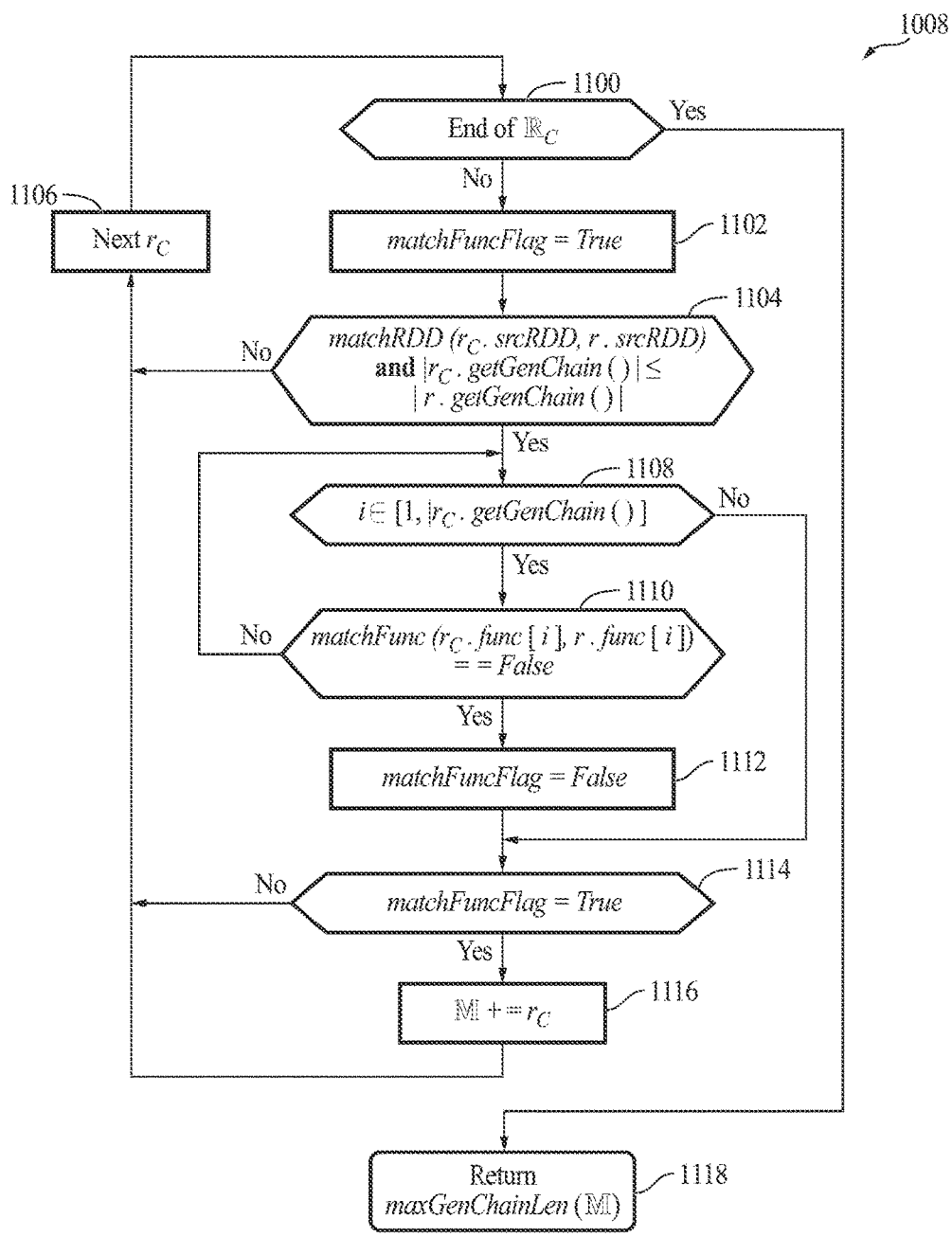
FIG. 11 is a flow diagram illustrating a process of matching generation chains performed by the cache manager, according to some example embodiments of the present invention.

FIG. 11 is a flow diagram illustrating the process 1008 of matching generation chains (i.e., the matchGenChain function) performed by the cache manager 110, according to some example embodiments of the present invention.

Process 1008 (the matchGenChain function) implements what may be called the RDD detection policy. The cache manager 110 may operate to detect those RDDs and corresponding operations that users are not explicitly declaring in their application. To this end, the cache manager 110 first searches each stored RDD from inside to outside (e.g., left to right or "source to destination" in FIGS. 9A/9B/9C) of their generating chain (source RDD, to each functions). According to some embodiments, the cache manager 110 identifies (finds) the longest reusable chain and reuses that as a detected chain. The process 1008 is also shown in pseudo code below:

| Process 1008 |
|---|
| 1    Procedure matchGenChain (r) |
| 2        for each candidate RDD $r_C$ do |
| 3            matchFuncFlag = True |
|                 If matchRDD($r_C$.srcRDD,r.srcRDD) and |
|                 $|r_C$.getGenChain( )$|$ ≤ |
| 4            $|r$.getGenChain( )$|$ then |

-continued

| Process 1008 |
|---|
| 5          for i ∈ [1, $\|r_C$.getGenChain( )$\|$] do /* from inside to outside */ |
| 6              if matchFunc($r_C$.func[i],r.func[i]) == False then |
| 7                  matchFuncFlag = False |
| 8                  break |
| 9          if matchFuncFlag = True then |
| 10             $\mathbb{M}$ += $r_C$ |
| 11     return maxGenChainLen($\mathbb{M}$) | where $\mathbb{M}$ represents a set of victim RDDs to be evicted from the storage memory 306a.

In acts 1100 to 1106, the cache manager 110 checks whether the iterated RDD $r_C$ has the same source RDD as the requested new RDD r. The cache manager 110 further ensures that candidate cached RDD $r_C$ is not longer than the new RDD r, because the cache manager 110 aims to reuse cached RDD(s) as part of the new RDD r. In acts 1108 to 112, the cache manager 110 iterates the comparison process following a from-inside-to-outside-of-functions order to check whether each operation (i.e., function) of the current RDD matches the corresponding function of the new RDD r. For example, if $r_C=f_4(f_3(f_2(f_1(f_0(R_0)))))$, then the cache manager 110 checks $R_0$, $f_0$, $f_1$, $f_2$, $f_3$, and $f_4$ of $r_C$ against the generating logic chain of the new RDD r. Only when all the iterated functions of a cached RDD match the new RDD's functions, the cache manager 110 adds the current iterated cached RDD into the candidate set $\mathbb{M}$, in acts 1114 and 116. Finally, in acts 1118, the cache manager 110 returns the longest RDD GenChain that may be reused by the new RDD r from the candidate set $\mathbb{M}$ (via the maxGenChainLen function). In other words, the cache manager 110 identifies a subset of intermediate data, each one of the subset of intermediate data having a same intermediate data source as the new intermediate data and a generating logic chain that is not longer than that of the new intermediate data. The cache manager 110 further compares functions of the generating logic chain of each one of the subset of intermediate data to those of the new intermediate data, in a sequence, to identify the reusable intermediate data as one of the subset of intermediate data having a longest sequence of matching functions with the new intermediate data.

According to some embodiments, the process 1008 described above may be further improved (e.g., optimized or sped up) by using some advanced data structure to record the detected duplicated RDDs and corresponding generating chains (such as a mapping table with assign functions of both RDD and functions) and adding them into the score table (e.g., Table 2). For example, if $RDD_1$ and $RDD_2$ are detected as identical, then embodiments of the present invention record both $RDD_1$ and $RDD_2$ in one row together (in the RDD column) with their GenChains (in the GenChain column), which mean the row will be [$R_1,R_2$; $R_1$'s GenChain, $R_2$'s GenChain; . . . ]. Additionally, performance may be improved by further analyzing and making decisions on whether to store the RDD in the memory (e.g., the storage memory 306a) or not (i.e., re-compute next time), and advanced techniques to achieve that goal may be based on any suitable method known in the art (e.g., Kathpal et al., "Analyzing Compute vs. Storage Tradeoff for Video-aware Storage Efficiency," HotStorage (2012); and Khanafer et al., "The Constrained Ski-Rental Problem and its Application to Online Cloud Cost Optimization," INFOCOM, 2013 Proceedings IEEE. IEEE (2013), the entire contents of which are incorporated herein by reference).

Figure 12:
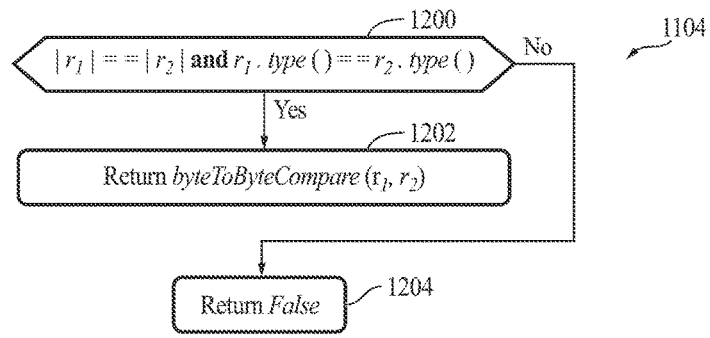
FIG. 12 is a flow diagram illustrating a process of matching RDDs performed by the cache manager, according to some example embodiments of the present invention.

FIG. 12 is a flow diagram illustrating the process 1104 of matching RDDs (i.e., the matchRDD function) performed by the cache manager 110, according to some example embodiments of the present invention.

According to some embodiments, the cache manager 110 first checks, in act 1200, whether the two input RDDs have the same size and the same type (in terms of data structures, objects, etc.; act 1200). If the stated conditions are satisfied, the cache manager 110 uses a byte-to-byte comparison (the byteToByteCompare function; act 1202) to further detect whether the two input RDDs are identical. However, embodiments of the present invention are not limited a byte-to-byte comparison, and any suitable comparison may be utilized. The process 1104 is also shown in pseudo code below:

| Process 1104 |
|---|
| 1     Procedure matchRDD ($r_1,r_2$) |
| 2         if $\|r_1\|$ == $\|r_2\|$ and $r_1$.type( ) == $r_2$.type( ) then |
| 3             return byteToByteCompare($r_1,r_2$) |
| 4         else |
| 5             return Flase |

In Spark, operations (i.e., functions) can be categorized into transformations, actions and other categories. Table 3 lists some example RDD transformations and actions available in Spark, where a signature of each operation is chosen to match other APIs in Scala and other functional languages, and type parameters are shown in square brackets (Seq[T] denotes a sequence of elements of type T). A difference between transformations and actions is that the former are lazy operations that define a new RDD, while the latter launch a computation to return a value to the program or write data to external storage.

TABLE 3

| Categories | Functions | Details |
|---|---|---|
| Transformations | map(f: T ⇒ U) | RDD[T] ⇒ RDD[U] |
| | filter(f: T ⇒ Bool) | RDD[T] ⇒ RDD[T] |
| | flatMap(f: T ⇒ Seq[U]) | RDD[T] ⇒ RDD[U] |
| | sample(fraction: Float) | RDD[T] ⇒ RDD[T] (Deterministic sampling) |
| | groupByKey() | RDD[(K,V)] ⇒ RDD[(K, Seq[V])] |
| | reduceByKey(f: (V, V) ⇒ V) | RDD[(K,V)] ⇒ RDD[(K, V)] |
| | union() | (RDD[T], RDD[T] ⇒ RDD[T] |
| | join() | (RDD[(K, V)], RDD[(K, W)]) ⇒ RDD[(K, (V, W))] |
| | cogroup() | (RDD[(K, V)], RDD[(K, W)]) ⇒ RDD[(K, (Seq[V], Seq[W]))] |
| | crossProduct() | (RDD[T], RDD[U]) ⇒ RDD[(T, U)] |
| | mapValues(f: V ⇒ W) | RDD[(K,V)] ⇒ RDD[(K, W)] (Preserves partitioning) |

TABLE 3-continued

| Categories | Functions | Details |
| --- | --- | --- |
| Actions | sort(c: Comparator[K]) | RDD[(K,V)] ⇒ RDD[(K, V)] |
| | partitionBy(p: Partitioner[K]) | RDD[(K,V)] ⇒ RDD[(K, V)] |
| | count() | RDD[T] ⇒ Long |
| | collect() | RDD[T] ⇒ Seq[T] |
| | reduce(f: (T, T) ⇒ T) | RDD[T] ⇒ T |
| | lookup(k, K) | RDD[(K, V)] ⇒ Seq[V] (On hash/range partitioned RDDs) |
| | save(path: String) | Outputs RDD to a storage system, e.g., HDFS |

According to some embodiments of the present invention, the cache manager 110 detects those identical functions that result in exactly the same output when supplied with the same input, while these functions are not explicitly hard-coded by the users. Identical functions may be uniquely determined according to the type (signature) and input RDD(s) (act 1200). For example, in FIG. 9A, $R_0 = R_8$, $f_1( ) = f_9( )$, etc. Accordingly, the cache manager 110 may merge these duplicated generating chains and refine (e.g., reduce or minimize) the topological graph of RDD DAG, and thus, reduce system resource consumption, such as amount of used memory (e.g., local/remote volatile and/or non-volatile memory).

In some embodiments, the cache manager 110 differentiates between deterministic and non-deterministic operations and automatically tracks changes to the stored RDDs and their generating chains (e.g., time cost of re-computing if a cached RDD's parent RDD is evicted). However, not all functions can be uniquely determined by their signature/type and input. As such, according to some examples, the cache manager 110 operates only on deterministic functions, which may be determined uniquely (e.g., groupByKey, reduceByKey and sort can result in an identical hash or range partitioned RDD with the same input RDD(s)), and may not operate on non-deterministic functions, such as shuffling (or network traffic in general), which may output values in a non-deterministic manner.

Figure 13:
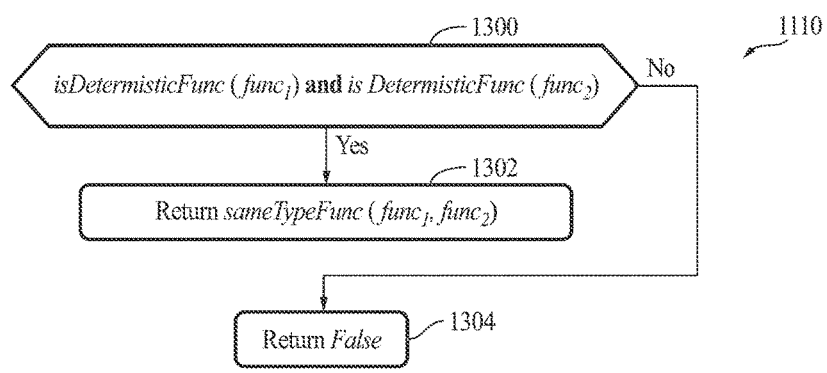
FIG. 13 is a flow diagram illustrating a process of matching functions performed by the cache manager, according to some example embodiments of the present invention.

FIG. 13 is a flow diagram illustrating the process 1110 of matching functions (i.e., the matchFunc function) performed by the cache manager 110, according to some example embodiments of the present invention.

In act 1300, the cache manager 110 first determines whether the two input functions are deterministic functions, which, for example, may be determined by searching through a list of preset deterministic functions (such as those listed in Table 3). If both input functions are deterministic, in act 1302, the cache manager 110 then compares the two functions to determine whether they are of the same type (i.e., signature) or not. In act 1302, the cache manager 110 returns the result of this comparison. If either of these two functions is not a deterministic function, the cache manager 110 returns False in act 1304. The process 1110 is also shown in pseudo code below:

| Process 1110 |
| --- |
| 1   Procedure matchFunc (func$_1$,func$_2$) |
| 2       if isDeterministicFunc(func$_1$) and isDeterministicFunc(func$_2$) then |
| 3           return sameTypeFunc(func$_1$,func$_2$) |
| 4       else |
| 5           return False |

Figure 14:
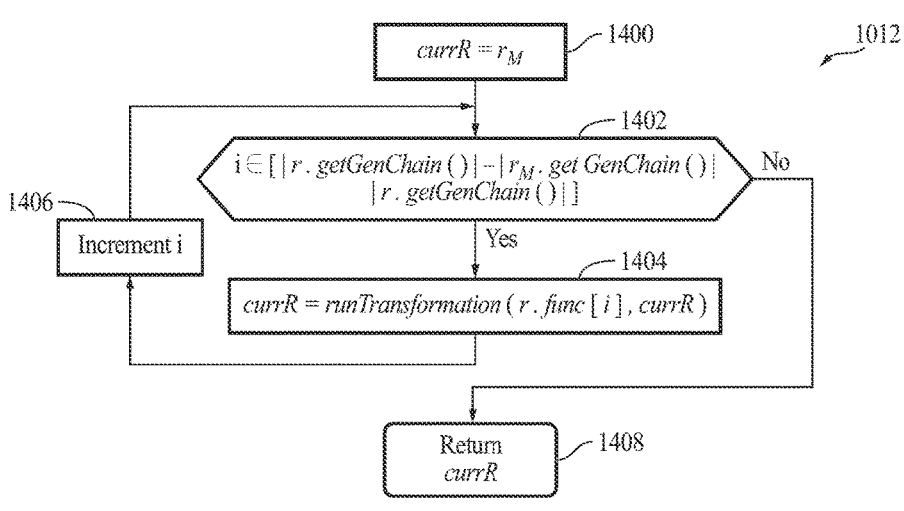
FIG. 14 is a flow diagram illustrating a process of obtaining the longest reusable chain as performed by the cache manager, according to some example embodiments of the present invention.

FIG. 14 is a flow diagram illustrating the process 1012 of obtaining the longest reusable chain (i.e., the genRDDFrom function) performed by the cache manager 110, according to some example embodiments of the present invention.

In act 1400 to 1406, the cache manager 110 computes the longest reusable RDD generation logic chain (GenChain) by calling runTransformation from the longest reusable generating logic chain, following the new RDD r's remaining generation logic chain. The process 1012 is also shown in pseudo code below:

| Process 1012 |
| --- |
| 1   Procedure genRDDFrom ($r_M$,r) |
| 2       currR = $r_M$ |
| 3       for i ∈ [|r.getGenChain( )|− |$r_M$.getGenChain( )|, |r.getGenChain( )|] do |
| 4           currR = runFunction(r.func[i],currR) |
| 5       return currR |

It will be understood by a person of ordinary skill in the art that the flow diagrams and the pseudo-code presented above are only for illustrating the concepts of the present invention, and that the processes described may be modified in a suitable manner to be performed more efficiently using more advanced approaches. For example, in process 512, dynamic programming may be adopted to avoid updating those $r_V$s that will be evicted later (i.e., $r_V \in \mathbb{V} \cap \mathbb{R}$).

It will be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer or section. Thus, a first element, component, region, layer, or section described herein could be termed a second element, component, region, layer, or section, without departing from the spirit and scope of the present invention.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present invention described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as would be commonly understood by one of ordinary skill in the art to which the present invention belongs. It will be further understood that terms, such as those defined in commonly used dictionaries, should be interpreted as having meanings that are consistent with their meanings in the context of the relevant art and/or the present specification, and should not be interpreted in an idealized or overly formal sense, unless expressly so defined herein.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A cache management system for managing a plurality of intermediate data, the cache management system comprising:
    a processor; and
    a memory having stored thereon the plurality of intermediate data and instructions that when executed by the processor, cause the processor to perform:
        identifying a new intermediate data to be accessed;
        loading the intermediate data from the memory in response to identifying the new intermediate data as one of the plurality of intermediate data;
        in response to not identifying the new intermediate data as one of the plurality of intermediate data:
            selecting a set of victim intermediate data from the plurality of intermediate data to evict from the memory based on a plurality of scores associated with respective ones of the plurality of intermediate data, the plurality of scores being based on a score table stored in the memory;
            evicting the set of victim intermediate data from the memory;
            updating the score table based on the set of victim intermediate data; and
            adding the new intermediate data to the plurality of intermediate data stored in the memory,
        wherein the score table comprises, for each intermediate data of the plurality of intermediate data, a number of children of the intermediate data, a size of the intermediate data, a re-compute time of the intermediate data.

2. The cache management system of claim 1, wherein the score table further comprises, for each intermediate data of the plurality of intermediate data, a generating logic chain of the intermediate data.

3. The cache management system of claim 1, wherein each one of the plurality of intermediate data is a resilient distributed data (RDD), and
    wherein the cache management system operates under a Spark framework.

4. The cache management system of claim 1, wherein the selecting of the set of victim intermediate data comprises:
    identifying a first set of intermediate data of the plurality of intermediate data, each one of the first set of intermediate data having a size less than that of the new intermediate data.

5. The cache management system of claim 4, wherein the selecting of the set of victim intermediate data further comprises:
    sorting the first set of intermediate data in a sorted order based on first scores associated with respective ones of the first set of intermediate data; and
    adding ones of the first set of intermediate data to the set of victim intermediate data to be evicted, based on the sorted order, while a cumulative size of the set of victim intermediate data is less than the new intermediate data.

6. The cache management system of claim 5, wherein the order is an ascending order.

7. The cache management system of claim 5, wherein the generating of each one of the first scores comprises:
    calculating a product of a re-compute time and a number of children of an associated one of the first set of intermediate data; and dividing the calculated product by a size of the associated one of the first set of intermediate data to calculate the one of the first scores.

8. The cache management system of claim 4, wherein the selecting of the set of victim intermediate data comprises:
in response to a size of the first set of intermediate data being smaller than the new intermediate data:
emptying the set of victim intermediate data;
identifying a second set of intermediate data of the plurality of intermediate data, each one of the second set of intermediate data having a size greater than or equal to that of the new intermediate data;
generating second scores associated with respective ones of the plurality of intermediate data based on the score table; and
selecting one intermediate data, as the set of victim intermediate data, from a second set of intermediate data having a lowest associated score among the second scores.

9. The cache management system of claim 8, wherein the generating of the second scores comprises:
generating each one of the second scores based on a re-compute time of, a number of children of, and a size of an associated one of the second set of intermediate data stored at the score table.

10. The cache management system of claim 1, wherein the updating of the score table comprises:
for each one of the set of victim intermediate data:
identifying a child intermediate data of the one of the set of victim intermediate data;
calculating a re-compute time of the child intermediate data based on a re-compute time of the one of the set of victim intermediate data; and
updating the score table based on the calculated re-compute time of the child intermediate data.

11. A cache management system for managing a plurality of intermediate data, the cache management system comprising:
a processor; and
a memory having stored thereon a plurality of intermediate data and instructions that when executed by the processor, cause the processor to perform:
identifying a new intermediate data to be accessed;
loading the intermediate data from the memory in response to identifying the new intermediate data as one of the plurality of intermediate data;
in response to not identifying the new intermediate data as one of the plurality of intermediate data:
generating a plurality of scores associated with respective ones of the plurality of intermediate data, each of the plurality of scores being based on a re-compute time of, a number of children of, and a size of an associated one of the plurality of intermediate data stored at a score table in the memory;
selecting a set of victim intermediate data from the plurality of intermediate data to evict from the memory based on a plurality of scores associated with respective ones of the plurality of intermediate data;
evicting the set of victim intermediate data from the memory;
updating the score table based on the set of victim intermediate data; and
adding the new intermediate data to the plurality of intermediate data stored in the memory.

12. A method of managing a plurality of intermediate data stored in a memory, the method comprising:
identifying, by a processor, a new intermediate data to be accessed;
loading, by the processor, the intermediate data from the memory in response to identifying the new intermediate data as one of the plurality of intermediate data;
in response to not identifying the new intermediate data as one of the plurality of intermediate data:
selecting, by the processor, a set of victim intermediate data from the plurality of intermediate data to evict from the memory based on a plurality of scores associated with respective ones of the plurality of intermediate data, the plurality of scores being based on a score table stored in the memory;
evicting, by the processor, the set of victim intermediate data from the memory;
updating, by the processor, the score table based on the set of victim intermediate data; and
adding, by the processor, the new intermediate data to the plurality of intermediate data stored in the memory,
wherein the score table comprises, for each intermediate data of the plurality of intermediate data, a number of children of the intermediate data, a size of the intermediate data, a re-compute time of the intermediate data.

13. The method of claim 12, wherein the score table further comprises, for each intermediate data of the plurality of intermediate data, a generating logic chain of the intermediate data.

14. The method of claim 12, wherein the selecting of the set of victim intermediate data comprises:
identifying a first set of intermediate data of the plurality of intermediate data, each one of the first set of intermediate data having a size less than that of the new intermediate data.

15. The method of claim 14, wherein the selecting of the set of victim intermediate data comprises:
sorting the first set of intermediate data in a sorted order based on first scores associated with respective ones of the first set of intermediate data; and
adding ones of the first set of intermediate data to the set of victim intermediate data to be evicted, based on the sorted order, while a cumulative size of the set of victim intermediate data is less than or equal to the new intermediate data,
wherein the order is an ascending order.

16. The method of claim 15, wherein the selecting of the set of victim intermediate data further comprises:
generating each one of the first scores based on a re-compute time of, a number of children of, and a size of an associated one of the first set of intermediate data stored at the score table.

17. The method of claim 14, wherein the selecting of the set of victim intermediate data comprises:
in response to a size of the first set of intermediate data being smaller than the new intermediate data:
emptying the set of victim intermediate data;
identifying a second set of intermediate data of the plurality of intermediate data, each one of the second set of intermediate data having a size greater than or equal to that of the new intermediate data;
generating second scores associated with respective ones of the plurality of intermediate data based on the score table; and selecting one intermediate data, as the set of victim intermediate data, from a second set of intermediate data having a lowest associated score among the second scores.

18. The method of claim 17, wherein the generating of the second scores comprises:
generating each one of the second scores based on a re-compute time of, a number of children of, and a size of an associated one of the second set of intermediate data stored at the score table.

19. The method of claim 12, wherein the updating of the score table comprises:
for each one of the set of victim intermediate data:
identifying a child intermediate data of the one of the set of victim intermediate data;
calculating a re-compute time of the child intermediate data based on a re-compute time of the one of the set of victim intermediate data; and
updating the score table based on the calculated re-compute time of the child intermediate data.

20. A cache management system for managing a plurality of intermediate data, the cache management system comprising:
a processor; and
a memory having stored thereon the plurality of intermediate data and instructions that when executed by the processor, cause the processor to perform:
identifying a new intermediate data to be accessed;
loading the intermediate data from the memory in response to identifying the new intermediate data as one of the plurality of intermediate data;
in response to not identifying the new intermediate data as one of the plurality of intermediate data:
selecting a set of victim intermediate data from the plurality of intermediate data to evict from the memory based on a plurality of scores associated with respective ones of the plurality of intermediate data, the plurality of scores being based on a score table stored in the memory;
evicting the set of victim intermediate data from the memory;
updating the score table based on the set of victim intermediate data; and
adding the new intermediate data to the plurality of intermediate data stored in the memory,
wherein the selecting of the set of victim intermediate data comprises:
identifying a first set of intermediate data of the plurality of intermediate data, each one of the first set of intermediate data having a size less than that of the new intermediate data; and
in response to the first set of intermediate data not being empty:
sorting the first set of intermediate data in a sorted order based on first scores associated with respective ones of the first set of intermediate data;
adding ones of the first set of intermediate data to the set of victim intermediate data to be evicted, based on the sorted order, while a cumulative size of the set of victim intermediate data is less than the new intermediate data; and
generating each one of the first scores based on a re-compute time of, a number of children of, and a size of an associated one of the first set of intermediate data stored at the score table.

* * * * *